(12) United States Patent
Yang et al.

(10) Patent No.: US 12,297,322 B2
(45) Date of Patent: May 13, 2025

(54) TRIAZINE-BASED MEMBRANES FOR GAS SEPARATION

(71) Applicants: UT-Battelle, LLC, Oak Ridge, TN (US); University of Tennessee Research Foundation, Knoxville, TN (US)

(72) Inventors: Zhenzhen Yang, Knoxville, TN (US); Ilja Popovs, Knoxville, TN (US); Sheng Dai, Knoxville, TN (US)

(73) Assignees: UT-Battelle, LLC, Oak Ridge, TN (US); University of Tennessee Research Foundation, Knoxville, TN (US)

( * ) Notice: Subject to any disclaimer, the term of this patent is extended or adjusted under 35 U.S.C. 154(b) by 705 days.

(21) Appl. No.: 17/517,993

(22) Filed: Nov. 3, 2021

(65) Prior Publication Data

US 2022/0145008 A1 May 12, 2022

Related U.S. Application Data

(60) Provisional application No. 63/111,149, filed on Nov. 9, 2020.

(51) Int. Cl.
*B01D 53/22* (2006.01)
*B01D 61/02* (2006.01)
(Continued)

(52) U.S. Cl.
CPC ....... *C08G 73/0644* (2013.01); *B01D 53/228* (2013.01); *B01D 61/027* (2013.01);
(Continued)

(58) Field of Classification Search
CPC .................. C08G 73/0644; C08G 73/065; B01D 53/228; B01D 61/027; B01D 69/02; B01D 71/62; B01D 2325/02834; B01D 2325/04
See application file for complete search history.

(56) References Cited

U.S. PATENT DOCUMENTS 8,247,142 B1 * 8/2012 Cote .................... C08G 65/007
427/372.2
8,372,566 B1 * 2/2013 Cote .................... G03G 5/0603
430/59.1
(Continued)

OTHER PUBLICATIONS

Xu et al "Fluorinated, Sulfur-Rich, Covalent Triazine Frameworks for EnhancedConfinement of Polysulfides in Lithium-Sulfur Batteries" ACS Appl. Mater. Interfaces 2017, 9, 37731-37738 (Year: 2017).*

(Continued)

*Primary Examiner* — Anthony R Shumate
(74) *Attorney, Agent, or Firm* — Scully, Scott, Murphy & Presser, P.C.

(57) ABSTRACT

A polymer composition comprising a covalent triazine framework having the following structure:

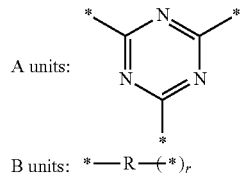

wherein: each asterisk (*) in A units denotes a point of covalent bonding with an asterisk in B units, and each asterisk (*) in B units denotes a point of covalent bonding with an asterisk in A units; r is an integer of 1-3; R is a fluorinated hydrocarbon containing at least two aromatic rings and at least one ether linkage between aromatic rings; the composition includes a multiplicity of A units and multiplicity of B units; and a portion of the connection points are terminated by endcapping nitrile groups. Also (Continued)

described are methods for producing the polymer and a microporous carbon material produced by pyrolysis of the porous polymer membrane. Also described are methods for using the polymer and microporous carbon material for gas or liquid separation, filtration, or purification.

18 Claims, 12 Drawing Sheets

(51) Int. Cl.
  *B01D 69/02* (2006.01)
  *B01D 71/62* (2006.01)
  *C08G 73/06* (2006.01)
(52) U.S. Cl.
  CPC ............ *B01D 69/02* (2013.01); *B01D 71/62* (2013.01); *C08G 73/065* (2013.01); *B01D 2325/02834* (2022.08); *B01D 2325/04* (2013.01)

(56) References Cited

U.S. PATENT DOCUMENTS

| | | | |
|---|---|---|---|
| 9,249,241 B2 | 2/2016 | Dai et al. | |
| 9,731,249 B2 | 8/2017 | Dai et al. | |
| 9,873,094 B2 | 1/2018 | Hong et al. | |
| 10,233,098 B2 | 3/2019 | Mahurin et al. | |
| 11,891,481 B2* | 2/2024 | Swager | B01D 71/52 |
| 2005/0244695 A1* | 11/2005 | Kiefer | C08G 73/0688 521/27 |
| 2008/0226815 A1* | 9/2008 | Pramanik | B32B 27/20 427/79 |
| 2013/0145931 A1* | 6/2013 | Liu | B01D 53/228 96/14 |
| 2014/0045107 A1* | 2/2014 | Vella | G03G 5/14795 428/327 |
| 2014/0045108 A1* | 2/2014 | Vella | G03G 5/14795 430/58.65 |
| 2014/0204160 A1* | 7/2014 | Cote | B41M 5/0256 347/103 |
| 2015/0059579 A1* | 3/2015 | Park | B01D 53/228 96/14 |
| 2015/0258505 A1* | 9/2015 | Hironaka | B01D 71/58 96/13 |
| 2016/0091805 A1* | 3/2016 | McGuire | G03G 5/14769 430/133 |
| 2016/0175767 A1* | 6/2016 | Richter | H01M 8/04156 95/52 |

OTHER PUBLICATIONS

Du, N., et al., "Polymer nanosieve membranes for CO2-capture applications", Nature Materials May 2011, Published online Apr. 3, 2011, pp. 372-375, vol. 10.

Hug, S., et al., "Nitrogen-Rich Covalent Triazine Frameworks as High-Performance Platforms for Selective Carbon Capture and Storage", Chemistry of Materials 2015, Received Aug. 31, 2015, Revised Nov. 11, 2015, Published Nov. 11, 2015, pp. 8001-8010, 27.

Katekomol, P., et al., "Covalent Triazine Frameworks Prepared from 1,3,5-Tricyanobenzene", Chemistry of Materials 2013, Revised Feb. 19, 2013, Published Mar. 3, 2013, pp. 1542-1548, 25.

Koros, W., et al., "Materials for next-generation molecularly selective synthetic membranes", Nature Materials Mar. 2017, Published online Jan. 23, 2017, pp. 289-297, vol. 16.

Tahir, N., et al., "Development of Covalent Triazine Frameworks as Heterogeneous Catalytic Supports", Polymers 2019, Accepted Aug. 5, 2019, Published Aug. 9, 2019, pp. 1-24, 11, 1326.

Yang, Z., et al., "Influence of fluorination on CO2 adsorption in materials derived from fluorinated covalent triazine framework precursors", Journal of Materials Chemistry A, 2019, Accepted Jul. 3, 2019, pp. 17277-17282, 7.

Yang, Z., et al., "Surpassing Robeson Upper Limit for CO2/N2 Separation with Fluorinated Carbon Molecular Sieve Membranes", Chem, Mar. 12, 2020, Revised Aug. 5, 2019, Accepted Dec. 6, 2019, Published Jan. 16, 2020, 36 pages, vol. 6.

Zhu, X., et al., "A Superacid-Catalyzed Synthesis of Porous Membranes Based on Triazine Frameworks for CO2 Separation", Journal of the American Chemical Society 2012, Revised May 19, 2012, Published May 25, 2012, pp. 10478-10484, 134.

Zhu, X., et al., "In Situ Doping Strategy for the Preparation of Conjugated Triazine Frameworks Displaying Efficient CO2 Capture Performance", Journal of the American Chemical Society 2016, Published Sep. 1, 2016 pp. 11497-11500, 138.

\* cited by examiner

2A

CN-1, R¹ = R² = H        TM-1, R¹=R²=H
F₆CN-1, R¹ = F, R² = H   F₆TM-1, R¹=F, R²=H
F₁₂CN-1, R¹ = R² = F     F₁₂TM-1, R¹=R²=F

2B

CN-2, R³=R⁴=H
F₃CN-2, R³=H, R⁴=F
F₆CN-2, R³=R⁴=F

TM-2, R³=R⁴=H
F₃TM-2, R³=H, R⁴=F
F₆TM-2, R³=R⁴=F

3A

3B

3C

3D

3E

3F

4C

4D

TRIAZINE-BASED MEMBRANES FOR GAS SEPARATION

CROSS-REFERENCE TO RELATED APPLICATIONS

The present application claims benefit of U.S. Provisional Application No. 63/111,149, filed Nov. 9, 2020, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates to the field of porous polymer and carbon membranes, and methods of gas separation by use of such membranes.

BACKGROUND OF THE INVENTION

Emission of carbon dioxide ($CO_2$) arising from the combustion of fossil fuels has raised widespread environmental concern. Exploring cost-effective and scalable technologies for carbon capture from emission sources may successfully reduce anthropogenic $CO_2$ emissions. Various carbon capture technologies, such as physical adsorption, chemical absorption, and membrane separation, have been widely investigated. Compared with other modes, membrane separation possesses many inherent advantages, such as high energy efficiency, low capital investments, operational simplicity and flexibility to scale up, and is considered a very promising technology (e.g., N. Du et al., *Energy Environ. Sci.*, 5, 7306-7322, 2012).

Membrane separation relies on the difference in permeation rates of different gases traversing the membrane. Unfortunately, although polymeric membranes have been successfully commercialized since the 1980s, the separation performance is limited by an undesirable trade-off relationship between permeability (P) and selectivity (a). Thus, the separation performance is constrained by an upper limit, which has been illustrated empirically by Robeson (L. M. Robeson, *J. Membr. Sci.*, 320, 390-400, 2008) and theoretically by Freeman (B. D. Freeman, *Macromolecules*, 32, 375-380, 1999). Ongoing research efforts have been directed to the design and preparation of nanoporous polymeric materials to overcome this limit by, for example, using thermally rearranged (TR) polymers, polymers of intrinsic microporosity (PIMs), and mixed-matrix membranes (MMM). However, such efforts have resulted in limited improvements in separation performance.

Highly selective carbon dioxide separation from flue gas or other sources is a particularly challenging task. Chemical absorption methods that utilize, for example, ethanolamine for $CO_2$ capture, require large amounts of energy to regenerate the adsorbent and release the $CO_2$ gas. The development of a gas separation membrane that could efficiently separate carbon dioxide from other gases with substantial permeability and selectivity would be a significant advance in the field of gas separation technology.

SUMMARY OF THE INVENTION

In one aspect, the present disclosure is directed to covalent triazine framework (CTF) polymer membranes that exhibit exceptional gas permeabilities and selectivities for separating gases, such as separating $CO_2$ from other gas molecules, such as $N_2$ and $O_2$. Hence, these polymer membranes have excellent potential for large-scale gas separations of commercial and environmental relevance. Aside from containing a multiplicity of triazine units, the polymer membranes described herein are fluorinated and contain aromatic (typically, phenyl) groups connected by at least one ether linkage between aromatic groups. The polymer membranes described herein may also be porous, and more particularly, microporous by possessing micropores having a size of 0.1 nm to 2 nm or ultramicropores having a size of 0.1 nm to 1 nm.

More particularly, the CTF polymer has the following structure:

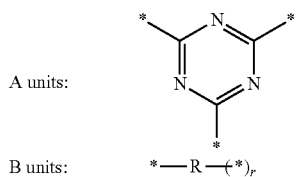

A units:

B units:  $*-R-(*)_r$ wherein: each asterisk (*) in A units denotes a point of covalent bonding with an asterisk in B units, and each asterisk (*) in B units denotes a point of covalent bonding with an asterisk in A units; r is an integer of 1-3; R is a fluorinated hydrocarbon containing at least two aromatic (e.g., benzene) rings and at least one ether linkage between aromatic rings; the composition includes a multiplicity of A units and multiplicity of B units; and a portion of the connection points are terminated by endcapping nitrile groups.

In another aspect, the present disclosure is directed to a method of producing the above described CTF polymer and membranes composed thereof. In the method, at least partially fluorinated polynitrile (e.g., dinitrile, trinitrile, or tetranitrile) molecules containing at least two aromatic (e.g., benzene) rings and at least one ether linkage between aromatic rings undergo nitrile group trimerization to triazine units by reaction with a fluorinated sulfonic superacid, such as $CF_3SO_3H$ or $FSO_3H$. To produce a membrane, the superacid may be mixed with the nitrile monomer, and the mixture stirred before being poured into a mold (e.g., a flat or planar object with surrounding edges to contain the mixture) with subsequent exposure to thermal treatment (e.g., about 100° C. for 15-30 minutes) to induce trimerization polymerization (curing) and solidification.

In another aspect, the present disclosure is directed to a microporous carbon material containing elemental carbon doped with nitrogen, oxygen, and fluorine atoms and wherein at least a portion of the nitrogen atoms are within triazine units. The foregoing carbon material can be produced by carbonization (e.g., at 400-600° C.) of the CTF polymer described above. When a CTF polymer membrane is carbonized, a microporous carbon membrane results. The micropores in the microporous carbon material have a size within a range of 0.1 nm to 2 nm or within a sub-range thereof. The micropores in the carbon material typically also include ultramicropores having a size within a range of 0.1 nm to 1 nm.

In another aspect, the present disclosure is directed to a method of gas separation by use of the above-described CTF polymer membranes or carbonized forms thereof. In the method, a mixture of gases is passed through the CTF polymer or carbonized membrane, with the result that one or more gases pass through and exit the membrane, while one or more gases are hindered or prevented from passing through and exiting the membrane. The selective passage or retainment of the gases can be attributed to differences in physisorption and pore size distribution. In particular embodiments, the method includes passing a carbon dioxide-containing mixture of gases (such as from flue gas) through a CTF polymer or carbonized membrane, wherein gas exiting the membrane has an increased carbon dioxide concentration relative to the original (starting) carbon dioxide-containing mixture of gases.

BRIEF DESCRIPTION OF THE DRAWINGS

FIGS. 2A and 2B show synthetic routes and structures of membranes using monomers with two cyano groups (FIG. 2A) or three cyano groups (FIG. 2B). FIG. 2C shows photographs (including inset) of the $F_8TM$-1 membrane (where $F_8TM$-1 is the CTF polymer derived from $F_8CN$-1 fluorinated monomer, as shown in FIG. 1). FIG. 2D shows FTIR spectra of $F_8TM$-1 and TM-1 (where TM-1 is the CTF polymer derived from CN-1 non-fluorinated monomer, as shown in FIG. 1). FIG. 2E shows CP/MAS $^{13}C$ NMR spectra of $F_8TM$-1 and TM-1. FIG. 2F shows XPS (C1s, F1s, N1s, and O1s) spectra of $F_8TM$-1.

FIG. 3A shows a top view of $F_8TM$-1. FIG. 3B shows a cross-section of $F_8TM$-1. FIG. 3C is an enlarged view of the section outlined in FIG. 3B. FIG. 3D shows a top view of $F_8TM$-1-500. FIG. 3E shows a cross-section of $F_8TM$-1-500. FIG. 3F is an enlarged view of the section outlined in FIG. 3E. Scale bars, 100 nm for (A), (C), (D), (F) and 3 μm for (B) and (E).

FIG. 4A shows double logarithmic plots of selectivity versus permeability for $CO_2/N_2$ showing the Robeson upper bound. FIG. 4B shows $CO_2$ adsorption isotherms of $F_8TM$-1 and TM-1 measured at 273 K and 298 K. FIG. 4C shows $CO_2$ uptake capacities at 273 K and 298 K of different types of membranes including $F_8TM$-1 and TM-1, as well as these after pyrolysis at 400-600° C. FIG. 4D shows $N_2$ adsorption and desorption isotherm curves at 77 K. FIG. 4E shows pore-size-distribution curves obtained from the adsorption branches by using NLDFT method. FIG. 4F shows plots of selectivity versus permeability for $CO_2/N_2$, with data from the present disclosure and the literature.

DETAILED DESCRIPTION OF THE INVENTION

Figure 1:
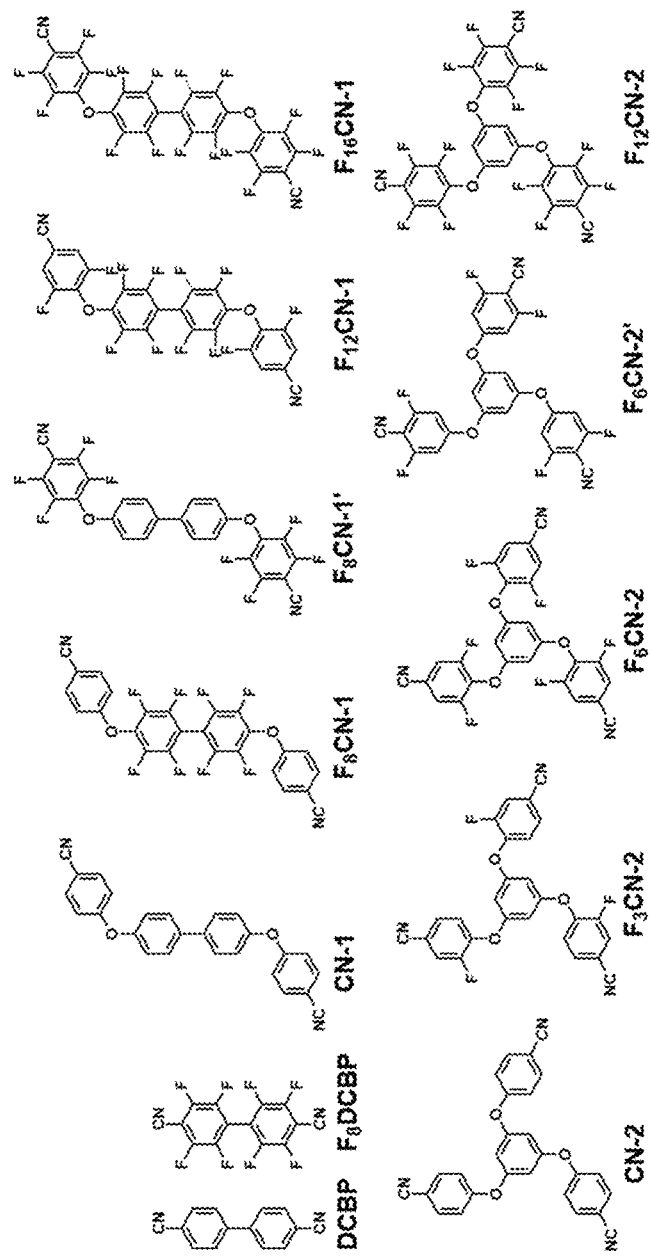
FIG. 1 shows structures of aromatic nitrile monomers used to prepare fluorinated covalent triazine framework (CTF) polymers.

In a first aspect, the present disclosure is directed to a covalent triazine framework (CTF) polymer useful in gas separation and related applications. The CTF polymer is at least partially fluorinated and contains a multiplicity of triazine units, a multiplicity of aromatic rings, and at least one ether (—O—) linkage between aromatic rings. The term "aromatic ring," as used herein, refers to a single, i.e., monocyclic, ring (e.g., benzene or pyridine ring). However, two or more aromatic rings may be linked or fused to result in a fused or unfused bicyclic, tricyclic, tetracyclic, or higher cyclic ring system as described in further detail below. The CTF polymer may also include endcapping nitrile groups or acid-hydrolyzed versions thereof (e.g., carboxylic acid groups).

In some embodiments, one or more aromatic rings in the CTF polymer are substituted with one or more hydrocarbon groups (R') containing 1-12 carbon atoms. In a first embodiment, the term "hydrocarbon group" (identified as R') is a group composed solely of carbon and hydrogen. In different embodiments, one or more of the hydrocarbon groups can independently contain, for example, one, two, three, four, five, six, seven, eight, nine, ten, eleven, or twelve carbon atoms, or a number of carbon atoms within a particular range bounded by any two of the foregoing carbon numbers.

The hydrocarbon group (R') can be, for example, a saturated and straight-chained hydrocarbon group (i.e., straight-chained or linear alkyl group). Some examples of straight-chained alkyl groups include methyl, ethyl, n-propyl, n-butyl, n-pentyl, n-hexyl, n-heptyl, n-octyl, n-nonyl, n-decyl, n-undecyl, and n-dodecyl groups.

The hydrocarbon group (R') can alternatively be a saturated and branched hydrocarbon group (i.e., branched alkyl group). Some examples of branched alkyl groups include isopropyl (2-propyl), isobutyl (2-methylprop-1-yl), sec-butyl (2-butyl), t-butyl, 2-pentyl, 3-pentyl, 2-methylbut-1-yl, isopentyl (3-methylbut-1-yl), 1,2-dimethylprop-1-yl, 1,1-dimethylprop-1-yl, neopentyl (2,2-dimethylprop-1-yl), 2-hexyl, 3-hexyl, 2-methylpent-1-yl, 3-methylpent-1-yl, and isohexyl (4-methylpent-1-yl), wherein the "1-yl" suffix represents the point of attachment of the group.

The hydrocarbon group (R') can alternatively be a saturated and cyclic hydrocarbon group (i.e., cycloalkyl group). Some examples of cycloalkyl groups include cyclopropyl, cyclobutyl, cyclopentyl, cyclohexyl, cycloheptyl, and cyclooctyl groups. The cycloalkyl group can also be a polycyclic (e.g., bicyclic) group by either possessing a bond between two ring groups (e.g., dicyclohexyl) or a shared (i.e., fused) side (e.g., decalin and norbornane).

The hydrocarbon group (R') can alternatively be an unsaturated and straight-chained hydrocarbon group (e.g., a straight-chained olefinic or alkenyl group). The unsaturation occurs by the presence of one or more carbon-carbon double bonds and/or one or more carbon-carbon triple bonds. Some examples of straight-chained olefinic groups include vinyl, propen-1-yl (allyl), 3-buten-1-yl ($CH_2$=CH—$CH_2$—$CH_2$—), 2-buten-1-yl ($CH_2$—CH=CH—$CH_2$—), butadienyl, 4-penten-1-yl groups, 3-hexen-1-yl, 7-octen-yl, 9-decen-1-yl, and 9,11-dodecadienyl. An example of a straight-chained alkynyl group is a propargyl group.

The hydrocarbon group (R') can alternatively be an unsaturated and branched hydrocarbon group (e.g., branched olefinic or alkenyl group). Some examples of branched olefinic groups include propen-2-yl, 3-buten-2-yl ($CH_2$=CH—CH.—$CH_3$), 3-buten-3-yl ($CH_2$=C.—$CH_2$—$CH_3$), 4-penten-2-yl, 4-penten-3-yl, 3-penten-2-yl, 3-penten-3-yl, and 2,4-pentadien-3-yl. The dot in the foregoing exemplary formulas represents the point of attachment of the group.

The hydrocarbon group (R') can alternatively be an unsaturated cyclic hydrocarbon group. The unsaturated cyclic group can be aromatic or aliphatic. Some examples of unsaturated cyclic hydrocarbon groups include cyclopentenyl, cyclopentadienyl, cyclohexenyl, cyclohexadienyl, phenyl, benzyl, cycloheptenyl, cycloheptadienyl, cyclooctenyl, cyclooctadienyl, and cyclooctatetraenyl groups. The unsaturated cyclic hydrocarbon group can also be a polycyclic group (such as a bicyclic or tricyclic polyaromatic group) by either possessing a bond between two of the ring groups (e.g., biphenyl) or a shared (i.e., fused) side, as in naphthalene, anthracene, phenanthrene, phenalene, or indene.

One or more of the hydrocarbon groups (R') may also include one or more heteroatoms (i.e., non-carbon and non-hydrogen atoms), such as one or more heteroatoms selected from oxygen, nitrogen, sulfur, silicon, phosphorus, boron, and halide atoms, as well as groups containing one or more of these heteroatoms (i.e., heteroatom-containing groups). Some examples of oxygen-containing groups include hydroxy (OH), alkoxy (OR'), carbonyl-containing (e.g., carboxylic acid, ketone, aldehyde, carboxylic ester, amide, and urea functionalities), nitro ($NO_2$), carbon-oxygen-carbon (ether), sulfonyl, and sulfinyl (i.e., sulfoxide) groups. Some particular examples of alkoxy groups —OR' include methoxy, ethoxy, n-propoxy, isopropoxy, n-butoxy, isobutoxy, t-butoxy, phenoxy, benzyloxy, 2-hydroxyethoxy, 2-methoxyethoxy, 2-ethoxyethoxy, vinyloxy, and allyloxy groups. In the case of an ether group, the ether group can also be a polyalkyleneoxide (polyalkyleneglycol) group, such as a polyethyleneoxide group. Some examples of nitrogen-containing groups include primary amine, secondary amine, tertiary amine (i.e., —$NR_2$ or $NR_3^+$, wherein R is independently selected from H and hydrocarbon groups set forth above), nitrile, amide (i.e., —C(O)$NR_2$ or —NRC(O)R, wherein R is independently selected from hydrogen atom and hydrocarbon groups set forth above), imine (e.g., —CR=NR, wherein R is independently H or a hydrocarbon group), oxime (—CR=N—OH), amidoxime (—C($NH_2$)=N—OH), nitro, urea (—NR—C(O)—$NR_2$, wherein R is independently H or a hydrocarbon group), and carbamate groups (—NR—C(O)—OR, wherein R is independently H or a hydrocarbon group). Some examples of phosphorus-containing groups include —$PR_2$, —$PR_3^+$, —P(=O)$R_2$, —P(OR)$_2$, —O—P(OR)$_2$, —R—P(OR)$_2$, —P(=O)(OR)$_2$, —O—P(=O)(OR)$_2$, —O—P(=O)(OR)(R), —O—P(=O)$R_2$, —R—P(=O)(OR)$_2$, R—P(=O)(OR)(R), and —R—P(=O)$R_2$ groups, wherein R is independently selected from hydrogen atom and hydrocarbon groups set forth above. Some examples of sulfur-containing groups include mercapto (i.e., —SH), thioether (i.e., sulfide, e.g., —SR), disulfide (—R—S—S—R), sulfoxide (—S(O)R), sulfone (—$SO_2$R), sulfonate (—S(=O)$_2$OR, wherein R is H, a hydrocarbon group, or a cationic group), and sulfate groups (—OS(=O)$_2$OR, wherein R is H, a hydrocarbon group, or a cationic group). Some examples of halide atoms include fluorine, chlorine, bromine, and iodine.

One or more of the heteroatoms described above (e.g., oxygen, nitrogen, and/or sulfur atoms) can be inserted between carbon atoms (e.g., as —O—, —NH—, or —S—) in any of the hydrocarbon groups described above to form a heteroatom-substituted hydrocarbon group or linker. Alternatively, or in addition, one or more of the heteroatom-containing groups can replace one or more hydrogen atoms on the hydrocarbon group or linker. In some embodiments, one or more of the above described heteroatoms or heteroatom-containing groups are excluded from R' or from the CTF polymer altogether.

In some embodiments, the CTF polymer is partially fluorinated, i.e., wherein a portion of hydrogen atoms are not substituted by fluorine atoms (i.e., wherein a portion of hydrogen atoms remain). In other embodiments, the CTF polymer is fully fluorinated, i.e., wherein all hydrogen atoms are substituted by fluorine atoms (i.e., no hydrogen atoms remain). In some embodiments, some or all fluorine atoms are located on aromatic rings. In other embodiments, some or all fluorine atoms are located in fluorinated hydrocarbon (or more particularly, fluoroalkyl groups), i.e., in addition to or in the absence of one or more fluorine atoms being present on one or more aromatic rings. The fluorinated hydrocarbon groups are typically bound to one or more aromatic rings in the CTF polymer. In some embodiments, the CTF polymer contains at least one fluorinated hydrocarbon group (or more particularly, fluoroalkyl group), which may be in the presence or absence of fluorination on the aromatic rings. The fluorinated hydrocarbon group may contain, for example, one to twelve carbon atoms (or more particularly, one to six, one to four, or one to three carbon atoms) and may be partially or fully fluorinated. The fluorinated hydrocarbon group may correspond to partially or fully fluorinated versions of any of the hydrocarbon groups (R') described above. For example, the fluorinated hydrocarbon group may be saturated or unsaturated and either linear, branched, or cyclic, as described above for R'.

In some embodiments, the fluorinated hydrocarbon group is a fluorinated alkyl group. Some examples of fluorinated alkyl groups include fluoromethyl, difluoromethyl, trifluoromethyl, 1-fluoroeth-1-yl (i.e., wherein the 1-position is the carbon of the alkyl group bound to the aromatic ring), 2-fluoroethyl, 1,1-difluoroethyl, 2,2-difluoroethyl, 1,2-difluoroethyl, 2,2,2-trifluoroethyl, perfluoroethyl, 1-fluoroprop-1-yl, 2-fluoroprop-1-yl, 3-fluoroprop-1-yl, 3,3-difluoroprop-1-yl, 3,3,3-trifluoroprop-1-yl, perfluoropropyl, 2-fluoroprop-2-yl, 1,1,1,3,3,3-hexafluoroprop-2-yl, perfluoroprop-2-yl, fluorobutyl, perfluorobutyl, perfluoro-t-butyl, fluorocyclopropyl, fluorocyclobutyl, fluorocyclopentyl, difluorocyclopentyl, difluorocyclohexyl, and perfluorocyclohexyl.

A portion or all of the aromatic rings may be carbocyclic or heterocyclic monocyclic rings. The carbocyclic ring contains only ring carbon atoms whereas the heterocyclic ring contains at least one ring heteroatom (typically, nitrogen, oxygen, and/or sulfur). A portion or all of the carbocyclic or heterocyclic monocyclic rings may also be linked or fused to result in one or more bicyclic, tricyclic, tetracyclic, higher cyclic, or fused ring systems. Some examples of carbocyclic aromatic rings and ring systems include phenyl (benzene), biphenyl, terphenyl (o-, m-, and p-isomers), quaterphenyl, 1,3,5-triphenylbenzene, quinquephenyl, naphthyl, anthracenyl, phenanthrenyl, pyrenyl, chrysenyl, and fluorenyl. Some examples of heterocyclic aromatic (heteroaromatic) rings and ring systems include pyridinyl, pyrazinyl, pyrimidinyl, imidazolyl, pyrrolyl, thienyl, furanyl, bipyridinyl, quinolinyl, xanthenyl, purinyl, and indolyl.

More particularly, the CTF polymer has the following structure:

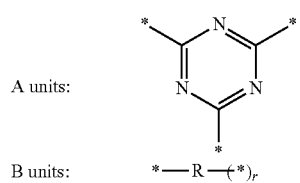

wherein each asterisk (*) in A units (i.e., triazine units) denotes a point of covalent bonding with an asterisk in B units, and each asterisk (*) in B units denotes a point of covalent bonding with an asterisk in A units. The subscript r is an integer of 1-3. B units in which r s 1 are divalent; B units in which r is 2 are trivalent; and B units in which r is 3 are tetravalent. The CTF polymer contains a multiplicity of A units and a multiplicity of B units, wherein the term "multiplicity" generally refers to the presence of at least three A units and at least three B units. For purposes of the invention, the CTF polymer has sufficient numbers of A and B units (e.g., at least or more than 5, 10, 20, 30, 40, 50, 100, 500, or 1000 of each type of unit) to function as a macroscopic material with suitable physical properties to maintain its integrity as a solid membrane. Typically, the CTF polymer includes an unlimited and vast number of A and B units, as is well known in the polymer arts.

The variable R in B units is a fluorinated hydrocarbon linking group containing at least two aromatic rings (any of those described earlier above, such as phenyl) and at least one ether linkage between aromatic rings, as described above. R may contain, for example, precisely, at least, or more than two, three, four, five, six, seven, or eight aromatic rings. In some embodiments, at least a portion (i.e., one, two, or more) of the aromatic rings in R are substituted with at least one fluorine atom per aromatic ring. In some embodiments, R is partially fluorinated, i.e., wherein a portion of hydrogen atoms are not substituted by fluorine atoms. In other embodiments, R is fully fluorinated, i.e., wherein all hydrogen atoms are substituted by fluorine atoms. In some embodiments, some or all fluorine atoms are located on aromatic rings of R. In other embodiments, some or all fluorine atoms are located in one or more fluorinated hydrocarbon (or more particularly, fluoroalkyl) groups of R, i.e., in addition to or in the absence of one or more fluorine atoms being present on one or more aromatic rings of R. The fluorinated hydrocarbon groups can be a partially or fully fluorinated version of any of the hydrocarbon groups (R') described above. In some embodiments, the fluorinated hydrocarbon groups are partially or fully fluorinated fluoroalkyl groups, particularly those containing 1-6, 1-4, or 1-3 carbon atoms, such as one or more selected from —CH$_2$F, —CHF$_2$, —CF$_3$, —CH$_2$CF$_3$, —CH$_2$CH$_2$F, —CH$_2$CF$_2$H, —CF$_2$F$_3$, —CH(CF$_3$)$_2$, —CF(CH$_3$)$_2$, and —CF(CF$_3$)$_2$. The fluorinated hydrocarbon (or more particularly, fluoroalkyl) groups are typically bound to one or more aromatic rings in R. In some embodiments, R contains at least one fluorinated hydrocarbon (or more particularly, fluoroalkyl) group, which may be in the presence or absence of fluorination on the aromatic rings of R.

In a particular embodiment, R has the following structure:

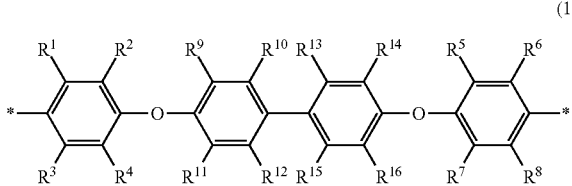

(1)

In Formula (1), $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently selected from hydrogen atom, fluorine atom, hydrocarbon groups (R') containing 1-12 carbon atoms, —OR" groups, —SR" groups, and —NR"$_2$ groups, wherein R" is independently selected from hydrogen atom and R' groups, and wherein the R' hydrocarbon group is optionally (i.e., may or may not be) substituted with one or more fluorine atoms to result in a fluorinated hydrocarbon group (or more particularly, fluorinated alkyl group), as described above. In some embodiments, one or more of $R^{17}$-$R^{28}$ are fluorine atoms. In some embodiments, groups ortho to the connection point (i.e., $R^1$, $R^3$, $R^6$, and $R^8$) are not fluorine atom. In some embodiments, one or more (i.e., a portion or all) of $R^1$-$R^{16}$ are fluorine atoms. In other embodiments, one or more (i.e., a portion or all) of $R^1$-$R^{16}$ are not fluorine atoms, or a portion or all of $R^1$-$R^{16}$ are hydrogen atoms or any other group other than fluorine provided for $R^1$-$R^{16}$.

In some embodiments of Formula (1), $R^2$, $R^4$, $R^5$, and $R^7$ are fluorine atoms while $R^3$, $R^6$, $R^8$, and $R^9$-$R^{16}$ are hydrogen atoms; or $R^2$, $R^4$, $R^5$, $R^7$ and $R^9$-$R^{16}$ are fluorine atoms while $R^1$, $R^3$, $R^6$, and $R^8$ (groups ortho to the connection points) are hydrogen atoms; or $R^1$-$R^4$ and $R^5$-$R^8$ are fluorine atoms while $R^9$-$R^{16}$ are hydrogen atoms; or $R^1$-$R^4$ and $R^5$-$R^8$ are hydrogen atoms while $R^9$-$R^{16}$ are fluorine atoms; or in other embodiments, $R^1$-$R^{16}$ are all fluorine atoms. In other embodiments, one or more of $R^1$-$R^{16}$ are fluorinated hydrocarbon groups, such as any of the fluorinated versions of R' described, or more particularly, any of the fluorinated alkyl groups described above. In some embodiments, one or more of $R^1$-$R^{16}$ are fluorinated hydrocarbon (or more particularly, fluorinated alkyl) groups, and one or more of $R^1$-$R^{16}$ are selected from hydrogen atom, fluorine atom, hydrocarbon groups (R') containing 1-12 carbon atoms, —OR" groups, —SR" groups, and —NR"$_2$ groups. In some embodiments, one or more of $R^1$-$R^{16}$ are fluorinated hydrocarbon (or more particularly, fluorinated alkyl) groups, with none of $R^1$-$R^{16}$ being fluorine atoms. In any of the alternative embodiments provided above in which groups in Formula (1) are selected as fluorine atoms, the fluorine atoms may be replaced with fluorinated hydrocarbon (or more particularly, fluorinated alkyl) groups. In yet other embodiments, one or more of $R^1$-$R^{16}$ are selected from hydrocarbon groups (R') which are aromatic (e.g., phenyl or fused ring) groups, which may or may not be fluorinated.

In a first set of embodiments of Formula (1), one or more (or a portion) of $R^1$-$R^{16}$ are fluorine atoms and one or more (or a portion) of $R^1$-$R^{16}$ are hydrogen atoms. In the foregoing embodiments, $R^1$-$R^{16}$ may be selected only from fluorine atoms and hydrogen atoms. In a second set of embodiments, one or more (or a portion) of $R^1$-$R^{16}$ are fluorinated hydrocarbon (or more particularly, fluorinated alkyl) groups and one or more of $R^1$-$R^{16}$ are hydrogen atoms. In further embodiments of the last embodiment, none of $R^1$-$R^{16}$ are fluorine atoms, or more particularly, the remainder of $R^1$-$R^{16}$ are hydrogen atoms. In more particular embodiments, $R^1$-$R^{16}$ may be selected only from fluorinated hydrocarbon groups (or more particularly fluorinated alkyl groups) and hydrogen atoms.

In Formula (1), any two adjacent groups selected from $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ groups are optionally interconnected. In some embodiments, none of $R^1$-$R^{16}$ are interconnected, while in other embodiments, at least one pair of adjacent groups selected from $R^1$-$R^{16}$ are interconnected. The interconnection results in formation of another fused ring.

As a first example, $R^{10}$ and $R^{13}$ in Formula (1) may be interconnected to form an additional benzene ring fused to the other shown benzene rings. The resulting structure is depicted as follows:

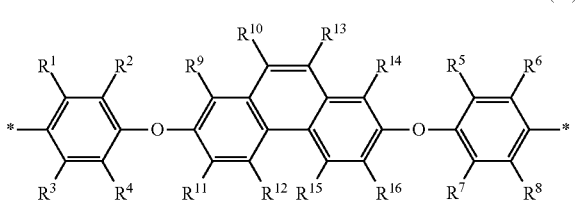

(1a)

As a further example of interconnection, $R^{12}$ and $R^{15}$ in Formula (1a) may also be interconnected to form a tetracyclic fused ring system. The resulting structure is depicted as follows:

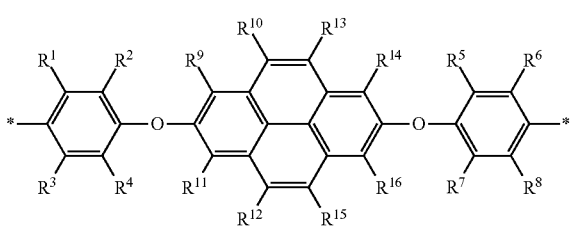

(1b)

Alternatively, starting from Formula (1), $R^1$ and $R^2$ may be interconnected and $R^7$ and $R^8$ may be separately interconnected to form the following structure:

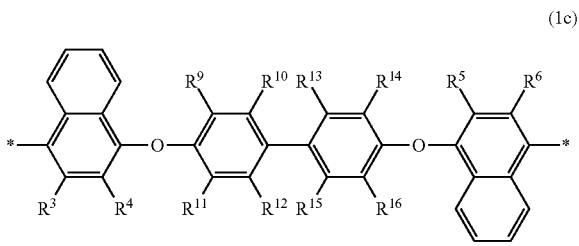

(1c)

wherein hydrogen atoms on additional formed rings may independently be substituted with any of the groups provided above for $R^1$-$R^{16}$ provided under Formula (1).

In another particular embodiment, R has the following structure:

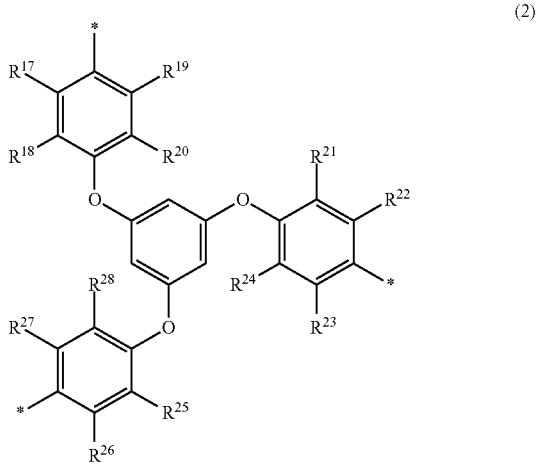

(2)

In Formula (2), $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are independently selected from hydrogen atom, fluorine atom, hydrocarbon groups (R') containing 1-12 carbon atoms, —OR" groups, —SR" groups, and —NR"$_2$ groups, wherein R" is independently selected from hydrogen atom and R' groups, and wherein the R' hydrocarbon group is optionally substituted with one or more fluorine atoms to result in a fluorinated hydrocarbon group (or more particularly, fluorinated alkyl group), as described above. In some embodiments, one or more (i.e., a portion or all) of $R^{17}$-$R^{28}$ are fluorine atoms. In other embodiments, one or more (i.e., a portion or all) of $R^{17}$-$R^{28}$ are not fluorine atoms, or a portion or all of $R^{17}$-$R^{28}$ are hydrogen atoms or any other group other than fluorine provided for $R^{17}$-$R^{28}$. In some embodiments, groups ortho to the connection point (i.e., $R_{17}$, $R_{19}$, $R_{22}$, $R^{23}$, $R^{26}$, and $R^{27}$) are not fluorine atom.

In some embodiments of Formula (2), $R^{18}$, $R^{21}$, and $R^{25}$ are fluorine atoms while the remainder of groups in $R^{17}$-$R^{28}$ are hydrogen atoms; or $R^{20}$, $R^{24}$ and $R^{28}$ are fluorine atoms while the remainder of groups in $R^{17}$-$R^{28}$ are hydrogen atoms; or $R^{18}$, $R^{20}$, $R^{21}$, $R^{24}$, $R^{25}$, and $R^{28}$ are fluorine atoms while the remainder of groups in $R^{17}$-$R^{28}$ are hydrogen atoms; or $R^{17}$, $R^{22}$, and $R^{26}$ are fluorine atoms while the remainder of groups in $R^{17}$-$R^{28}$ are hydrogen atoms; or $R^{19}$, $R^{23}$, and $R^{27}$ are fluorine atoms while the remainder of groups in $R^{17}$-$R^{28}$ are hydrogen atoms; or $R^{17}$, $R^{19}$, $R^{22}$, $R^{23}$, $R^{26}$, and $R^{27}$ are fluorine atoms while the remainder of groups in $R^{17}$-$R^{28}$ are hydrogen atoms; or $R^{18}$, $R^{20}$, $R^{21}$, $R^{24}$, $R^{25}$, and $R^{28}$ are hydrogen atoms while at least a portion (or all) of the remainder of groups in $R^{17}$-$R^{28}$ are fluorine atoms; or $R^{17}$, $R^{19}$, $R^{22}$, $R^{23}$, $R^{26}$ and $R^{27}$ (groups ortho to connection points) are hydrogen atoms while at least a portion (or all) of the remainder of groups in $R^{17}$-$R^{28}$ are fluorine atoms; or in other embodiments, $R^{17}$-$R^{28}$ are all fluorine atoms.

In other embodiments, one or more of $R^{17}$-$R^{28}$ are fluorinated hydrocarbon groups, such as any of the fluorinated versions of R' described, or more particularly, any of the fluorinated alkyl groups described above. In some embodiments, one or more of $R^{17}$-$R^{28}$ are fluorinated hydrocarbon (or more particularly, fluorinated alkyl) groups, and one or more of $R^{17}$-$R^{28}$ are selected from hydrogen atom, fluorine atom, hydrocarbon groups (R') containing 1-12 carbon atoms, —OR" groups, —SR" groups, and —NR"$_2$ groups. In some embodiments, one or more of $R^{17}$-$R^{28}$ are fluorinated hydrocarbon (or more particularly, fluorinated alkyl) groups, with none of $R^{17}$-$R^{28}$ being fluorine atoms. In any of the alternative embodiments provided above in which groups in Formula (2) are selected as fluorine atoms, the fluorine atoms may be replaced with fluorinated hydrocarbon (or more particularly, fluorinated alkyl) groups. In yet other embodiments, one or more of $R^{17}$-$R^{28}$ are selected from hydrocarbon groups (R') which are aromatic (e.g., phenyl or fused ring) groups, which may or may not be fluorinated.

In a first set of embodiments of Formula (2), one or more (or a portion) of $R^{17}$-$R^{28}$ are fluorine atoms and one or more (or a portion) of $R^{17}$-$R^{28}$ are hydrogen atoms. In the foregoing embodiments, $R^{17}$-$R^{28}$ may be selected only from fluorine atoms and hydrogen atoms. In a second set of embodiments, one or more (or a portion) of $R^{17}$-$R^{28}$ are fluorinated hydrocarbon (or more particularly, fluorinated alkyl) groups and one or more of $R^{17}$-$R^{28}$ are hydrogen atoms. In further embodiments of the last embodiment, none of $R^{17}$-$R^{28}$ are fluorine atoms, or more particularly, the remainder of $R^{17}$-$R^{28}$ are hydrogen atoms. In more particular embodiments, $R^{17}$-$R^{28}$ may be selected only from fluorinated hydrocarbon groups (or more particularly, fluorinated alkyl groups) and hydrogen atoms.

In Formula (2), any two adjacent groups selected from $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ groups are optionally interconnected. In some embodiments, none of $R^{17}$-$R^{28}$ are interconnected, while in other embodiments, at least one pair of adjacent groups selected from $R^{17}$-$R^{28}$ are interconnected. The interconnection results in formation of a fused ring.

As a first example, $R^{17}$ and $R^{18}$ in Formula (2) may be interconnected to form an additional benzene ring fused to the benzene ring the foregoing groups are bound to. The resulting structure is depicted as follows:

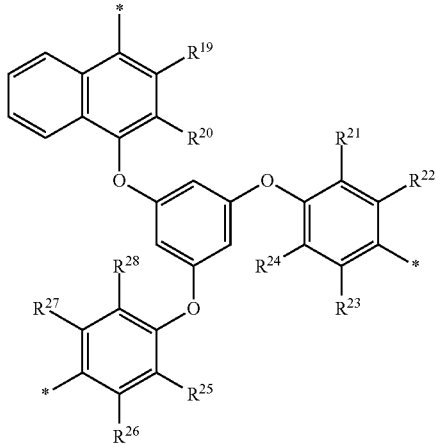

(2a)

wherein one or more hydrogen atoms on the additional formed ring may independently be substituted with any of the groups provided above for $R^{17}$-$R^{28}$ provided under Formula (2).

As a further example of interconnection, $R^{21}$ and $R^{22}$, and separately, $R^{25}$ and $R^{26}$, in Formula (2a) may also be interconnected. The resulting structure is depicted as follows:

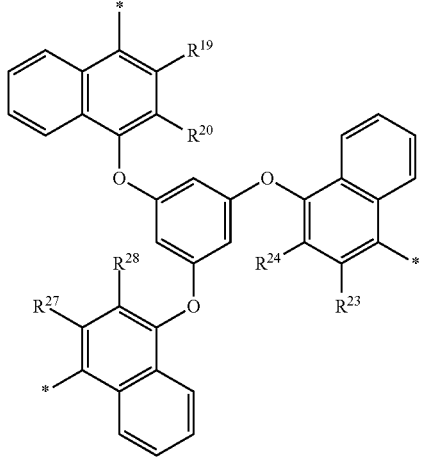

(2b)

As another example of interconnection, $R^{17}$ and $R^{18}$, and separately, $R^{19}$ and $R^{20}$, in Formula (2) may be interconnected to form two additional benzene rings fused to the benzene ring the foregoing groups are bound to. The resulting structure is depicted as follows:

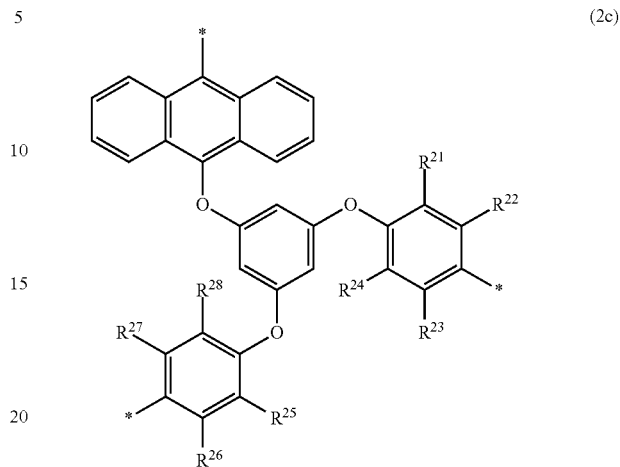

(2c)

wherein one or more hydrogen atoms on the additional formed rings may independently be substituted with any of the groups provided above for $R^{17}$-$R^{28}$ provided under Formula (2).

As a further example of interconnection, $R^{21}$ and $R^{22}$, and separately, $R^{23}$ and $R^{24}$, $R^{25}$ and $R^{26}$, and $R^{27}$ and $R^{28}$, in Formula (2c) may also be interconnected. The resulting structure is depicted as follows:

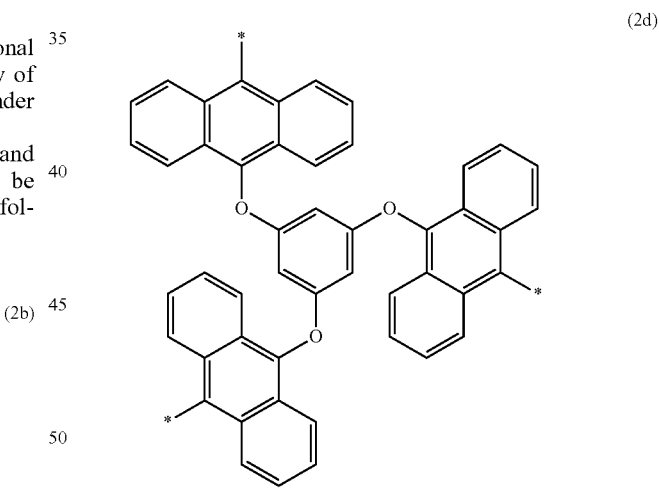

(2d)

wherein one or more hydrogen atoms on the additional formed rings may independently be substituted with any of the groups provided above for $R^{17}$-$R^{28}$ provided under Formula (2).

The CTF polymer may be non-porous or porous. However, generally, the CTF polymer has some level of microporosity by possessing micropores, which correspond to pore sizes up to or less than 2 nm. In different embodiments, the micropores have a size of precisely, about, up to, or less than, for example, 0.1, 0.2, 0.3, 0.4, 0.5, 0.6, 0.7, 0.8, 0.9, 1.0, 1.2, 1.5, or 1.8 nm, or a particular pore size, or a distribution of pore sizes, within a range bounded by any two of these values (e.g., 0.1-2 nm, 0.2-2 nm, 0.5-2 nm, 0.1-1.8 nm, 0.2-1.8 nm, 0.5-1.8 nm, 0.1-1.5 nm, 0.2-1.5 nm, or 0.5-1.5 nm). In some embodiments, the CTF polymer possesses ultramicropores, which correspond to pore sizes up to or less than 1 nm, e.g., 0.1-1 nm, 0.2-1 nm, 0.5-1 nm, 0.1-0.8 nm, 0.2-0.8 nm, or 0.5-0.8 nm. As used herein, the term "about" generally indicates within ±0.5%, 1%, 2%, 5%, or up to ±10% of the indicated value. For example, a pore size of about 1 nm generally indicates in its broadest sense 1 nm±10%, which indicates 0.9-1.1 nm. Alternatively, the term "about" can indicate a variation or average in a physical characteristic of a group, e.g., a population of pores. In some embodiments, the CTF polymer excludes pores having a size outside of any of the exemplary pore size ranges provided above.

In another aspect, the present disclosure is directed to a microporous carbon material produced by pyrolysis (carbonization) of the CTF polymer described above. Pyrolysis of a CTF polymer membrane produces a microporous carbon membrane. The pyrolysis temperature may be, for example, 400° C., 450° C., 500° C., 550° C., 600° C., 650° C., 700° C., or 750° C., or a temperature within a range bounded by any two of the foregoing temperatures. The pyrolysis may be conducted under an oxygen-containing (i.e., ambient air or reduced oxygen, e.g., no more than or less than 5% or 1% or 1000 ppm oxygen) or fully inert atmosphere (e.g., nitrogen and/or argon). The microporous carbon material is composed of elemental carbon doped with nitrogen, oxygen, and fluorine atoms, and wherein at least a portion of the nitrogen atoms are within triazine units. The fluorine content of the microporous carbon may vary from 0-30 wt %, e.g., typically at least 1, 2, or 5 wt % and up to 8, 10, 12, or 15 wt %. The CTF polymer may also have any of the foregoing fluorine contents above 0 wt %. The oxygen atoms may be incorporated in the carbon material in the form of one or more types of oxygen-containing groups, such as hydroxy, carbonyl, ether, ester, and/or carboxylic acid groups. The micropores in the microporous carbon material may have any of the pore sizes or pore size ranges provided above for the CTF polymer. The microporous carbon typically includes ultramicropores, as described above for the CTF polymer.

In some embodiments, the CTF polymer or microporous carbon further includes mesopores having a pore size of at least or above 2 nm and up to or less than 50 nm. In different embodiments, the mesopores have a pore size of precisely, about, up to, or less than, for example, 2.2 nm, 2.5 nm, 3 nm, 4 nm, 5 nm, 6 nm, 7 nm, 8 nm, 9 nm, 10 nm, 11 nm, 12 nm, 15 nm, 20 nm, 25 nm, 30 nm, 35 nm, 40 nm, or 45 nm, or a particular pore size, or a distribution of pore sizes, within a range bounded by any two of the foregoing exemplary values or between 2 nm and any of the foregoing exemplary values (e.g., 2-50 nm, 2.2-50 nm, 2.5-50 nm, or 3-50 nm), or between one of the foregoing exemplary pore sizes and 50 nm, or between any of the micropore or ultramicropore sizes and a mesopore size (e.g., 0.1-5 nm, 0.5-5 nm, 0.1-3 nm, 0.5-3 nm, 0.1-2.5 nm, or 0.5-2.5 nm).

In other embodiments, the CTF polymer or microporous carbon excludes a pore size greater than any of the mesopore sizes provided above (e.g., greater than 2 nm, 3 nm, or 5 nm), or the CTF polymer or microporous carbon excludes mesopores (2-50 nm) or larger size pores (i.e., macropores, which generally have a size of 50 nm or over) altogether. In some embodiments, the CTF polymer or microporous carbon excludes pores having a size outside of any one of the exemplary pore size ranges provided above or anywhere throughout this disclosure.

The pores are generally circular or oval-shaped. For circular or substantially circular pores, the pore size refers to the diameter of the pore. For pores that are substantially unsymmetrical or irregularly shaped, the pore size generally refers to either the average of the pore dimensions for a particular pore or to the average or longest dimension of such pores averaged over a population of such pores.

In one set of embodiments, a single distribution of pores is present in the CTF polymer or microporous carbon. A distribution (or "mode") of pores is generally defined by a single pore size of maximum (peak) pore volume concentration. The peak pore volume is generally in the micropore size range.

In some embodiments, the CTF polymer or microporous carbon possesses a bimodal, trimodal, or higher modal pore size distribution, which can be identified by the presence of, respectively, two, three, or a higher number of peak volume concentrations. In the case of a bimodal pore size distribution, the pore size distribution may be defined by a minimum pore size in the micropore size range and a maximum pore size also in the micropore size range or in the mesopore size range, with either two peak pore volumes in the micropore size range, or one peak pore volume in the micropore size range and another peak pore volume in the mesopore size range. In the case of a trimodal pore size distribution, the pore size distribution may be defined by two peak pore volumes in the micropore size range and one peak pore volume in the mesopore size range, or one peak pore volume in the micropore size range and two peak pore volumes in the mesopore size range.

Generally, for purposes of the present invention, the pore volume attributed to micropores in the CTF polymer or microporous carbon is greater than the pore volume attributed to mesopores or larger size pores. For example, in different embodiments, the percent pore volume attributed to micropores (or a sub-range within micropores) may be at least or above 50%, 55%, 60%, 65%, 70%, 75%, 80%, 85%, 90%, 95%, 98%, or 99% pore volume (by total pore volume) wherein it is understood that the total pore volume corresponds to 100% pore volume. The percent pore volume attributed to mesopores (if present) in the CTF polymer or microporous carbon is generally less than 50%, more typically up to or less than 45%, 40%, 30%, 25%, 20%, 15%, 10%, 5%, 2%, or 1% by total pore volume. The percent pore volume attributed to macropores, if present, in the CTF polymer or microporous carbon is generally no more than 1%, more typically no more than or less than 0.5%, or 0.1% by total pore volume. In some embodiments, the CTF polymer or microporous carbon possesses a substantial absence of mesopores and macropores. By a "substantial absence" of mesopores or macropores is generally meant that up to or less than 1%, 0.5%, or 0.1% of the total pore volume, or none of the pore volume, can be attributed to the presence of mesopores and/or macropores.

The pores of the CTF polymer or microporous carbon can also possess a level of uniformity, generally either in pore diameter, pore shape, and/or pore interspacing. In some embodiments, the pores may possess an average pore size corresponding to any of the pore sizes exemplified above, subject to a degree of variation of no more than, for example, ±10 nm, ±8 nm, ±6, nm, 5 nm, ±4 nm, ±3 nm, ±2 nm, 1 nm, or ±0.5 nm. In some embodiments, any one of the types of pores described above (e.g., the micropores or size range therein) are substantially uniform in size.

The CTF polymer or microporous carbon may possess a BET surface area of about or at least, for example, 50, 100, 200, 300, 400, 450, 500, 550, 600, 650, 700, 750, 800, 900, 1000, 1500, 1800, or 2000 m$^2$/g, or a surface area within a range bounded by any two of these values. The CTF polymer or microporous carbon may also possess a total pore volume of precisely, about, or at least, for example, 0.2 cm$^3$/g, 0.3 cm$^3$/g, 0.4 cm$^3$/g, 0.5 cm$^3$/g, 0.6 cm$^3$/g, 0.7 cm$^3$/g, 0.8 cm$^3$/g, 0.9 cm$^3$/g, 1.0 cm$^3$/g, 1.2 cm$^3$/g, 1.5 cm$^3$/g, 1.8 cm$^3$/g, 2 cm$^3$/g, 2.2 cm$^3$/g, 2.5 cm$^3$/g, 3.0 cm$^3$/g, 3.5 cm$^3$/g, 4.0 cm$^3$/g, 4.5 cm$^3$/g, or 5.0 cm$^3$/g, or a pore volume within a range bounded by any two of these values.

In some embodiments, the CTF polymer or microporous carbon described above is in the shape of a membrane, which corresponds to a substantially planar shape, such as a sheet or film. The membrane may have a range of suitable thicknesses for various applications, e.g., up to 500 or 1000 microns. The choice of thickness very much depends on the ultimate application and conditions expected in the ultimate application. However, for purposes of separating gases with reasonable permeability and selectivity, the membrane generally has a thickness of at least 10 or 20 microns and no more than about 150 or 200 microns. In different embodiments, the CTF polymer or microporous carbon membrane has a thickness of precisely, about, up to, or less than, for example, 10 µm, 15 µm, 20 µm, 25 µm, 30 µm, 35 µm, 40 µm, 45 µm, 50 µm, 55 µm, 60 µm, 65 µm, 70 µm, 75 µm, 80 µm, 85 µm, 90 µm, 95 µm, 100 µm, 110 µm, 120 µm, 130 µm, 140 µm, 150 µm, or 200 µm, or a thickness within a range bounded by any two of these values. For use in gas separation, the thickness may have a substantial effect on the permeability and selectivity, which may thus require careful selection of the membrane thickness to provide a separation with sufficient permeability and selectivity. The thickness of the membrane may also need to be selected on the basis of the types of gases to be separated.

The CTF polymer or microporous carbon membrane may or may not also function as part of a layered composite material, wherein the CTF polymer or microporous carbon membrane either overlays, underlies, or is sandwiched between one or more layers of another material. In some embodiments, the one or more layers of another material provides greater structural integrity to the membrane. If used in gas or liquid separation, filtration, or purification, the one or more layers of another material necessarily include structural features (e.g., pores or slits) that permit the gas or liquid to flow through the membrane. The membrane or layered composite structure in which it is incorporated may have other applications, such as a component (membrane) of a battery (e.g., lithium-ion battery) or fuel cell, catalyst support, or component of an energy storage or conversion device. The one or more layers of another material may be porous or non-porous, and can be composed of, for example, a metal (e.g., aluminum or chrome), ceramic (e.g., silica, alumina, or aluminosilicate), paper, plastic, graphite, metal oxide, metal sulfide, metal selenide, metal telluride, metal nitride, metal phosphide, or an organic, inorganic, or hybrid polymer, or combination thereof, depending on the particular application. In some embodiments, the membrane is monolithic (i.e., not disposed on or overlaid with a substrate).

In another aspect, the present disclosure is directed to a method for producing the CTF polymer and membranes composed thereof. Any method capable of nitrile trimerization of organic nitrile compounds can be used to produce the above described CTF polymers. The organic nitrile compound for purposes of the present invention has the following structure: NC—R—(CN)$_r$, which, as shown, provides the R linkages in B units when the organic nitrile compound is polymerized to form the CTF polymer. The trimerization reaction can be performed on a single organic nitrile compound or mixture of organic nitrile compounds. In the case of a mixture of organic nitrile compounds, the resulting CTF polymer will contain a corresponding mixture of R linkages within the scope described earlier above. In one set of embodiments, polymerization of the organic nitrile compound is achieved by catalytic polymerization with molten $ZnCl_2$ at approximately 400° C. for 40-48 hours. The $ZnCl_2$ method and other methods are described in detail in, for example, N. Tahir et al., *Polymers,* 11, 1326, 2019, which is incorporated herein by reference. In another set of embodiments, polymerization of the organic nitrile compound is achieved by catalytic polymerization with a superacid, such as $CF_3SO_3H$ or $FSO_3H$, such as described in X. Zhu et al., *J. Am. Chem. Soc.,* 134, 10478-10484, 2012, which is incorporated herein by reference, and as also described later on below. The superacid method advantageously employs a much lower temperature of approximately 100° C. Notably, in preferred embodiments, the superacid method is employed rather than the $ZnCl_2$ method in order to achieve a less fragmented, less decomposed, more structurally robust, and/or more crystalline polymer. To produce a membrane of the CTF polymer, the one or more organic nitrile compounds can be mixed with the trimerization catalyst, and the mixture poured into a planar mold, followed by appropriate heating to induce polymerization (curing), and ultimately removal of the membrane from the mold. The thickness of the membrane can be selected by adjusting the amount of mixture poured into the mold.

In another aspect, the present disclosure is directed to a method of gas separation by passing a mixture of at least two gases through the CTF polymer or microporous carbon membrane described above. Since at least one gas in the mixture of gases is substantially or completely prevented from passing (i.e., traversing) through the membrane, the phrase "passing a mixture of at least two gases through the porous polymer membrane" includes the possibility that only one or more select gases of the gas mixture will actually pass through and exit the membrane while one or more select gases may substantially or absolutely not pass through and exit the membrane even though they may initially enter the membrane to some degree. The gas separation can be a partial or complete separation of gases. In any event, the end result is that gas exiting the CTF polymer or microporous carbon membrane will have an increased concentration of a gas (e.g., carbon dioxide) separated from the original gaseous mixture relative to the initial concentration of the gas (e.g., carbon dioxide) in the initial gaseous mixture before being passed through the membrane. In the case where only a partial separation has been achieved, the partially separated gases may be passed through the membrane one or more additional times to improve on the separation. Moreover, the separation process may be conducted at a higher or lower temperature than room temperature (ca. 25° C.) and/or at a higher or lower pressure than normal atmospheric pressure (ca. 1 atm) in an effort to improve the separation.

The gases being separated may be or include, for example, carbon dioxide and nitrogen, or carbon dioxide and methane, or carbon dioxide and oxygen, or carbon dioxide and water vapor, or nitrogen and oxygen, or nitrogen and hydrogen, or oxygen and hydrogen, or oxygen and hydrogen, or ammonia and oxygen, or ammonia and hydrogen, or hydrogen and helium, or methane and nitrogen, or methane and hydrogen, or a mixture of three or more of any of the foregoing or other gases (e.g., carbon dioxide, nitrogen, and water vapor and/or oxygen and/or methane). Any one of the aforesaid gases may alternatively be separated from a gaseous mixture containing more than two gases, such as air or gaseous emission from an industrial or combustion process.

In some embodiments, the gas separation process may be integrally connected with a gaseous output emanating from an industrial or chemical process. In other embodiments, one or more gases (e.g., oxygen, nitrogen, hydrogen, or carbon dioxide) may be selectively passed through the porous membrane from air or an industrial gaseous emission while one or more other gases from air or an industrial gaseous emission does not pass through the porous membrane. In practice, the mixture of gases is typically transported into a chamber capped on one end by the membrane, which is typically clad in a metal (e.g., aluminum) or ceramic except for a space in which the membrane is exposed for the gaseous mixture to make contact. The chamber should be sealed to ensure that the gaseous mixture has no exit but through the membrane. In some embodiments, the gas mixture is pressurized to a pressure at or above 1 atm. In other embodiments, the gas mixture is at a pressure of less than 1 atm (e.g., 0.4-0.9 atm).

In particular embodiments, the method is directed to separation of carbon dioxide from a mixture of gases. Aside from carbon dioxide, the mixture of gases typically also includes a substantial proportion of nitrogen gas and some amount of water vapor. Although some degree of separation of carbon dioxide from air may be possible, the present disclosure is primarily concerned with separation of carbon dioxide from industrial or combustion emissions in which carbon dioxide is present in substantially higher concentrations, e.g., at least or above 1, 2, 3, 4, or 5 vol %, more typically 5-20 vol %, or more typically 5-14% in the case of flue gas.

In some embodiments, the gas separation process described above is integrated with a process that uses a gas being separated by the above described process. More particularly, the above described process may provide an in situ-generated separated gas for use in a process requiring the separated gas. Such an integrated process may be particularly advantageous in supplying a useful gas (e.g., oxygen or hydrogen) over time (i.e., as produced in situ), which dispenses with the need to house a large stock of the useful gas. A source of carbon dioxide produced by the instant process may be integrated with, for example, a process of making a food or beverage, a process for the production of liquid carbon dioxide or dry ice or a process in which liquid carbon dioxide or dry ice is used, or a process for bioconversion of carbon dioxide to fuel. A source of oxygen or oxygen-enriched air produced by the instant process may be integrated with, for example, a medical process, a welding process, a smelting process, or a chemical production process. A source of nitrogen or nitrogen-enriched air produced by the instant process may be integrated with, for example, a chemical production process (e.g., the production of ammonia by the Haber process), or a process requiring an inert gas to protect oxygen-sensitive compounds and materials, or a process for the production of liquid nitrogen or a process in which liquid nitrogen is used. A source of hydrogen produced by the instant process may be integrated with, for example, a process in which a fuel cell uses hydrogen as a reactant, a chemical production process (e.g., production of ammonia, hydrogenation, petroleum processing, production of syngas, or a reduction process), or a process for the production of liquid hydrogen or a process in which liquid hydrogen is used. A source of methane (natural gas) produced by the instant process may be integrated with, for example, a process that uses methane as fuel.

Examples have been set forth below for the purpose of illustration and to describe certain specific embodiments of the invention. However, the scope of this invention is not to be in any way limited by the examples set forth herein.

EXAMPLES

Preparation of Novel Aromatic Nitrile Monomers

A series of aromatic nitrile monomers were synthesized and used to prepare CTF polymers. The structures and corresponding abbreviations of the nitrile monomers are shown in FIG. 1.

Commercially available starting materials and solvents were purchased from vendors and were used without further purification unless noted otherwise. The $^1$H and $^{19}$F NMR spectra were recorded on a Bruker® 400 spectrometer using the residual solvent peaks, tetramethylsilane or α,α,α-trifluorotoluene ($\delta_{CF3}$=−62.61 ppm.) as the internal standard respectively. $^{13}$C Spectra were not included since they are not informative, due to extensive coupling between $^{13}$C and $^{19}$F nuclei, low intensity and number of missing peaks. [1,1'-biphenyl]-4,4'-dicarbonitrile (DCBP) was commercially available. 2,2',3,3',5,5',6,6'-octafluoro-[1,1'-biphenyl]-4,4'-dicarbonitrile ($F_8$DCBP), 1,3,5-tris((trimethylsilyl)oxy)benzene, and 4,4',4''-(benzene-1,3,5-triyltris(oxy))tribenzonitrile (CN-2) were prepared according to published methods.

Synthesis of 4,4'-([1,1'-biphenyl]-4,4'-diylbis(oxy))dibenzonitrile (CN-1)

The reaction flask (300 mL) containing magnetic stirring bar was charged with [1,1'-biphenyl]-4,4'-diol (5.59 g, 30 mmol), followed by the addition of 4-fluorobenzonitrile (9.69 g, 80 mmol). The reaction flask was purged with argon, and anhydrous DMSO (200 mL) was added. Anhydrous potassium carbonate (10.37 g, 75 mmol) was added in one portion, the reaction flask was capped with a septum and stirred at 150° C. for 8 hours. Additional amount of 4-fluorobenzonitrile (9.69 g, 80 mmol) was introduced and the reaction mixture was stirred at 150° C. for another 8 hours. The reaction mixture was poured in water under vigorous stirring and the resulting precipitate was filtered off and air dried. The title product was obtained after the re-crystallization from DMSO. The product was obtained after filtration as a white powder (7.35 g, 63%). $^1$H NMR (CDCl$_3$, 400 MHz) δ 7.07 (d, $^3$J=8.8 Hz, 4H), 7.15 (d, $^3$J=8.8 Hz, 4H), 7.62 (t, $^3$J=8.8 Hz, 8H); $^{13}$C NMR (CDCl$_3$, 100.6 MHz) δ 106.03, 118.04, 118.76, 120.69, 128.72, 134.17, 137.08, 154.40, 161.43.

Synthesis of 4,4'-([1,1'-biphenyl]-4,4'-diylbis(oxy))bis(2,3,5,6-tetrafluorobenzonitrile) ($F_8$CN-1)

The reaction flask (250 mL) containing magnetic stirring bar was charged with perfluoro-1,1'-biphenyl (6.68 g, 20 mmol), followed by the addition of 4-hydroxybenzonitrile (5.35 g, 45 mmol). The reaction flask was purged with argon, and anhydrous DMSO (70 mL) was added. Anhydrous potassium carbonate (8.30 g, 60 mmol) was added in one portion, the reaction flask was capped with a septum and stirred at 100° C. for 2 hours. The reaction mixture was poured in water under vigorous stirring and the resulting precipitate was filtered off and air dried. The title product was obtained after the recrystallization from isopropanol. The product was obtained after filtration as a white powder (9.7 g, 91%). $^1$H NMR (CDCl$_3$, 400 MHz) δ 7.14 (d, $^3$J=8.8 Hz, 4H), 7.71 (d, $^3$J=8.8 Hz, 4H); $^{19}$F NMR (CDCl$_3$, 376 Hz) δ−151.90-151.84 (m, 4F), −136.64~−136.57 (m, 4F);

$^{13}$C NMR (CDCl$_3$, 100.6 MHz) δ 103.33, 103.49, 103.64, 108.07, 116.47, 118.08, 133.98, 134.43, 140.12, 140.27, 142.80, 143.44, 145.98, 159.42.

Synthesis of 4,4'-((perfluoro-[1,1'-biphenyl]-4,4'-diyl)bis(oxy))dibenzonitrile (F$_8$CN-1')

The reaction flask (300 mL) containing magnetic stirring bar was charged with [1,1'-biphenyl]-4,4'-diol (5.59 g, 30 mmol), followed by the addition of pentafluorobenzonitrile (15.44 g, 80 mmol). The reaction flask was purged with argon, and anhydrous DMSO (200 mL) was added. Anhydrous potassium carbonate (10.37 g, 75 mmol) was added in one portion, the reaction flask was capped with a septum and stirred at room temperature for 24 hours. The reaction mixture was poured in water under vigorous stirring and the resulting precipitate was filtered off and air dried. The title product was obtained after the re-crystallization from isopropanol. The product was obtained after filtration as a white powder (10.0 g, 63%). $^1$H NMR (CDCl$_3$, 400 MHz) δ 7.08 (d, $^3$J=8.8 Hz, 4H), 7.54 (d, $^3$J=8.8 Hz, 4H); $^{19}$F NMR (CDCl$_3$, 376 Hz) δ −150.26∼−150.16 (m, 4F), −131.74∼−131.63 (m, 4F).

Synthesis of 4,4'-((perfluoro-[1,1'-biphenyl]-4,4'-diyl)bis(oxy))bis(3,5-difluorobenzonitrile) (F$_{12}$CN-1)

The reaction flask (250 mL) containing magnetic stirring bar was charged with perfluoro-1,1'-biphenyl (8.35 g, 25 mmol), followed by the addition of 3,5-difluoro-4-hydroxybenzonitrile (10.0 g, 64 mmol). The reaction flask was purged with argon, and anhydrous DMF (100 mL) was added. Anhydrous potassium carbonate (8.89 g, 64 mmol) was added in one portion, the reaction flask was capped with a septum and stirred at 140° C. for 24 hours. The reaction mixture was poured in water under vigorous stirring followed by the addition of 10 ml of acetic acid (Caution! Gas Evolution). The resulting aqueous layer was decanted and the residue was washed with 100 ml of deionized water and decanted once more. The residue was suspended in 160 mL of methanol and heated to boiling. After cooling to room temperature, the product was obtained after filtration as a white powder (4.9 g, 33%). $^{19}$F NMR (CDCl$_3$, 376 Hz) δ −155.38-155.32 (m, 4F), −137.30∼−137.20 (m, 4F), −123.90∼−123.80 (m, 4F). $^1$H NMR (CDCl$_3$, 400 MHz) δ 7.37 (m, 4H).

Synthesis of 4,4'-((2,2',3,3',5,5',6-heptafluoro-[1,1'-biphenyl]-4,4'-diyl)bis(oxy))bis(2,3,5,6-tetrafluorobenzonitrile) (F$_{16}$CN-1)

The reaction flask (250 mL) containing magnetic stirring bar was charged with 2,2',3,3',5,5',6,6'-octafluoro-[1,1'-biphenyl]-4,4'-diol (6.60 g, 20 mmol), followed by the addition of pentafluorobenzonitrile (11.68 g, 60 mmol). The reaction flask was purged with argon, and anhydrous DMSO (100 mL) was added. Anhydrous potassium carbonate (6.91 g, 50 mmol) was added in one portion, the reaction flask was capped with a septum and stirred at 120° C. for 2 hours. The reaction mixture was poured in water under vigorous stirring and the resulting precipitate was filtered off and air dried. The title product was obtained after the recrystallization from ethanol. The product was obtained after filtration as a white powder (4.9 g, 36%). $^{19}$F NMR (CDCl$_3$, 376 Hz) δ −154.35 (d, $^3$J=15.0 Hz, 4F), −152.64∼−152.54 (m, 4F), −136.13∼−136.06 (m, 4F), −130.74∼−130.64 (m, 4F).

Synthesis of 4,4',4"-(benzene-1,3,5-triyltris(oxy))tris (3-fluorobenzonitrile) (F$_3$CN-2)

The reaction flask (250 mL) containing magnetic stirring bar was charged with 1,3,5-tris((trimethylsilyl)oxy)benzene (10.28 g, 30 mmol), followed by the addition of 3,4-difluorobenzonitrile (13.90 g, 100 mmol). The reaction flask was purged with argon, and anhydrous DMF (100 mL) was added. Anhydrous cesium fluoride (1.52 g, 10 mmol) was carefully added in one portion, the reaction flask was capped with a septum connected to a bubbler and stirred at 120° C. for 24 hours. The reaction mixture was poured in water under vigorous stirring and the resulting precipitate was filtered off and air dried. The title product was obtained after the re-crystallization from ethanol. The product was obtained after filtration as a white powder (9.2 g, 63%). $^1$H NMR (CDCl$_3$, 400 MHz) δ 6.48 (s, 3H), 7.15 (t, $^3$J=8 Hz, 3H), 7.45-7.51 (m, 6H); $^{19}$F NMR (CDCl$_3$, 376 Hz) δ −126.76 (t, 3J=9.02 Hz, 3 F).

Synthesis of 4,4',4"-(benzene-1,3,5-triyltris(oxy))tris (3,5-difluorobenzonitrile) (F$_6$CN-2)

The reaction flask (250 mL) containing magnetic stirring bar was charged with 1,3,5-tris((trimethylsilyl)oxy)benzene (10.28 g, 30 mmol), followed by the addition of 3,4,5-trifluorobenzonitrile (15.71 g, 100 mmol). The reaction flask was purged with argon, and anhydrous DMF (100 mL) was added. Anhydrous cesium fluoride (1.52 g, 10 mmol) was carefully added in one portion, the reaction flask was capped with a septum connected to a bubbler and stirred at room temperature for 24 hours. The reaction mixture was poured in water under vigorous stirring and the resulting precipitate was filtered off and air dried. The title product was obtained after the recrystallization from methanol. The product was obtained after filtration as a white powder (15.0 g, 93%). $^1$H NMR (CDCl$_3$, 400 MHz) δ 6.30 (s, 3H), 7.34-7.40 (m, 6H); $^{19}$F NMR (CDCl$_3$, 376 Hz) δ −121.14 (d, $^3$J=6.8 Hz, 6F).

Synthesis of 4,4',4"-(benzene-1,3,5-triyltris(oxy))tris (2,3,5,6-tetrafluorobenzonitrile) (F$_{12}$CN-2)

The reaction flask (250 mL) containing magnetic stirring bar was charged with 1,3,5-tris((trimethylsilyl)oxy)benzene (10.28 g, 30 mmol), followed by the addition of pentafluorobenzonitrile (19.3 g, 100 mmol). The reaction flask was purged with argon, and anhydrous DMF (100 mL) was added. Anhydrous cesium fluoride (1.52 g, 10 mmol) was carefully added in one portion, the reaction flask was capped with a septum connected to a bubbler and stirred at room temperature for 24 hours. The reaction mixture was poured in water under vigorous stirring and the resulting precipitate was filtered off and air dried. The title product was obtained after the recrystallization from methanol. The product was obtained after filtration as a white powder (12.58 g, 67%). $^1$H NMR (CDCl$_3$, 400 MHz) δ 6.49 (s, 3H); $^{19}$F NMR (CDCl$_3$, 376 Hz) δ −149.65-∼149.55 (m, 6F), −130.49∼−130.38 (m, 6F).

Preparation of CTF Polymer Membranes

The membranes were synthesized through a similar procedure in the reported literature with some modification (X. Zhu et al., *J. Am. Chem. Soc.*, 134, 10478-10484, 2012). Briefly, 1 mL of CF$_3$SO$_3$H was added dropwise to 0.1 g of the aromatic nitrile monomers, except that 0.2 g of F$_8$CN-1 and 0.3 g of $F_{12}CN$-1 were needed per 1 mL of $CF_3SO_3H$, at room temperature under stirring. The viscous red solution was continuously stirred for 0.5 h (4 h for $F_{12}TM$-1) and then poured into a flat bottom glass dish with diameter of 5 cm and allowed to spread into a thin layer. Then, the dish was covered, and heated at 100° C. for 20 min (1 h for $F_{12}TM$-1), and a soft coating film was successfully formed. For the preparation of $F_{12}TM$-1, reaction time of 4 h at room temperature and 1 h at 100° C. was needed. The material was then quenched in cold water and immersed in diluted NaOH solution for 12 h to remove the excess $CF_3SO_3H$. After the material was washed with water and ethanol several times, the obtained transparent and flexible film was dried in a vacuum oven at 60° C. The yield was ~80%, with majority of the loss caused by the liquid transfer process. For the synthesis of N, O, F-doped carbonaceous membrane, in general, a piece of polymeric membrane precursor with diameter of 12 mm was placed in a tube furnace at certain temperature and maintained at this temperature for 12 h under a nitrogen gas flow (heating rate: 2° C.

For the fabrication of $F_8TM$-1-500 with thicknesses of 30, 75 and 146 μm, the precursors $F_8TM$-1 was different thicknesses were prepared in advance by changing the amount of $F_8CN$-1 and $CF_3SO_3H$. Briefly, 0.1 g, 0.2, and 0.4 g $F_8CN$-1 together with 0.5 mL, 1 mL, and 2 mL $CF_3SO_3H$ was added, respectively. Thickness (cross-section) of the membranes was measured by SEM, as shown, for example, in FIGS. 3B and 3E.

Synthesis of membrane from 2,2',3,3',5,5',6,6'-octafluoro-4,4'-biphenyldicarbonitrile ($F_8DCBP$)

2,2',3,3',5,5',6,6'-octafluoro-4,4'-biphenyldicarbonitrile ($F_8DCBP$) was selected as a monomer for the formation of polymeric membrane through the trimerization of aromatic nitriles with a superacid catalyst ($CF_3SO_3H$). However, using this approach, only light yellow powder was obtained under a variety of conditions, instead of the expected membrane, probably due to the low reactivity of the aromatic monomers containing fluorine substituents in the ortho positions relative to nitrile group. As previously reported, CTF-based membrane can be prepared through a polymerization of DCBP in the presence of $CF_3SO_3H$ (S. Zeng et al., Chem. Rev., 117, 9625-9673, 2017). However, membrane formation cannot be realized even using a monomer mixture composed of F-DCBP and DCBP with molar ratio of 1:9, only producing yellow polymer powder. Thus, attempts to prepare membranes using 2,2',3,3',5,5',6,6'-octafluoro-4,4'-biphenyldicarbonitrile ($F_8DCBP$) was largely unsuccessful. Introduction of ether groups into the para-position with respect to cyano group somewhat counteracts electron-withdrawing effect of fluorine atoms, thereby increasing the trimerization reactivity of aromatic nitrile monomers. On the other hand, oxygen-containing functionalities show $CO_2$-philic nature in $CO_2$ capture and separation applications.

Figure 2A:
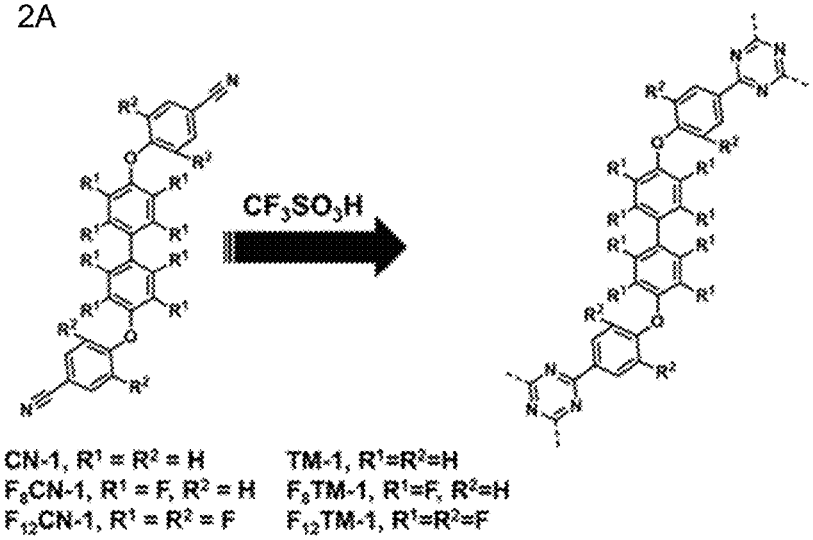
FIGS. 2A-2F show synthetic routes and characterization of fluorinated CTF polymers.

To investigate the above assumption, 4,4'-((perfluoro-[1,1'-biphenyl]-4,4'-diyl)bis(oxy))dibenzonitrile ($F_8CN$-1) was selected as a precursor for membrane synthesis. FIG. 2A provides a schematic representation of the corresponding polymerization procedure. Subjecting this starting material to acid resulted in the formation of transparent and flexible polymeric membrane ($F_8TM$-1) (FIG. 2C). The typical stress-strain curve was measured to evaluate the mechanical property of the membrane $F_8TM$-1, which shows a tensile strength of 41.0% with an ultimate stress of 37.4 MPa. Notably, the size and thickness of the membrane could be easily tuned by appropriately selecting the size of the petri dish during the membrane cast process. For the sake of comparison, the non-fluorinated TM-1 membrane was also synthesized using CN-1 as the monomer. As expected, the synthesized membranes are completely insoluble in common organic solvents such as dichloromethane, tetrahydrofuran and ethanol.

Investigation of Other Aromatic Nitrile Monomers

Next, aromatic nitrile monomers with fluorine atoms on the same benzene ring as cyano groups ($F_8CN$-1' and $F_{12}CN$-1) and perfluorinated ones ($F_{16}CN$-1) were also designed for the preparation of CTF-based membranes. With $F_{12}CN$-1 as the starting material, transparent membrane $F_{12}TM$-1 was obtained with higher monomer concentration and longer reaction time compared to the conditions for the synthesis of $F_8TM$-1. However, with $F_8CN$-1' and $F_{16}CN$-1 as the starting materials, only yellow polymer powders were obtained even under harsh reaction conditions, probably due to the strong electron-withdrawing character of the fluorine atoms, as well as high steric hindrance by introducing substituent groups in the ortho position relative to the cyano group, thereby lowering the reactivity of these monomers towards the trimerization reaction under metal-free and low temperature conditions.

Figure 2B:
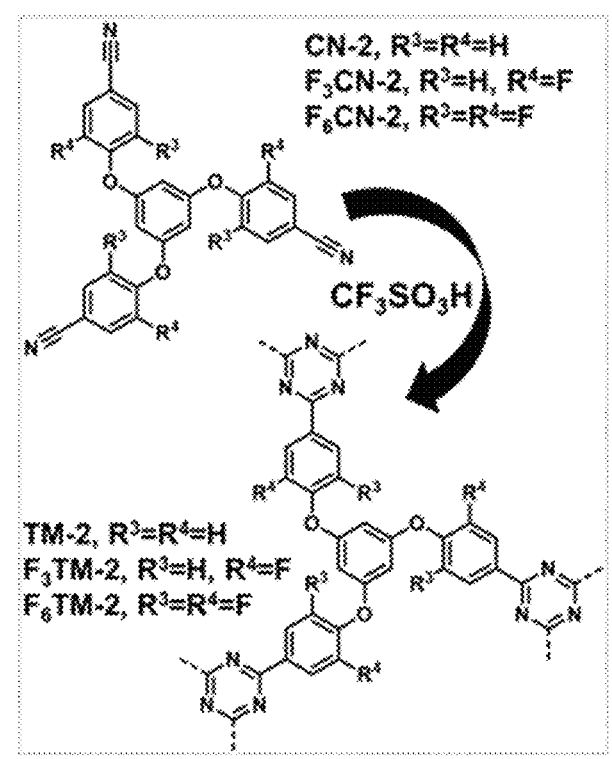
Figure 2C:
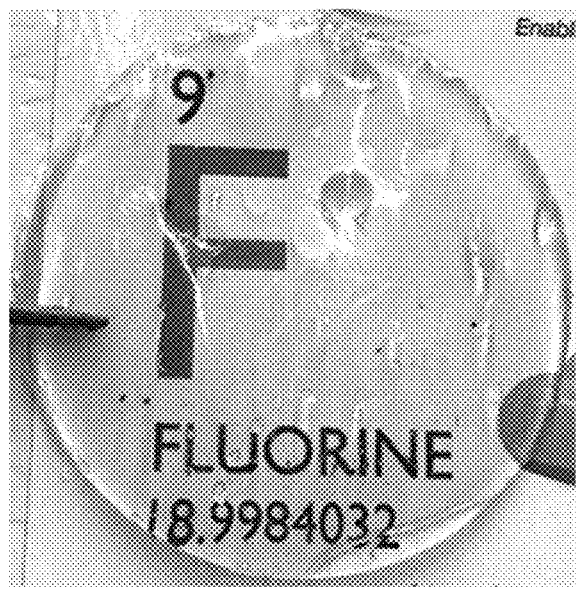

To further investigate the influence of the position of the fluorine substituents on the trimerization reaction, tri-substituted aromatic nitrile monomers with different fluorine content at the meta positions (CN-2, $F_3CN$-2 and $F_6CN$-2) were synthesized and CTF-functionalized membranes were all successfully obtained and denoted as TM-2, $F_3TM$-2, $F_6TM$-2, respectively (FIG. 2B). As with the case of linear dinitriles (vide supra), the introduction of fluorine atoms onto the benzene rings at the ortho-position relative to cyano groups ($F_6CN$-2' and $F_{12}CN$-2) of the monomers and subjecting them to the trimerization reaction conditions did not produce membrane. The results indicate that for the successful preparation of fluoro-containing CTF membranes, no fluorine atoms should occupy ortho-positions relative to the cyano groups. In addition, the fluorine content in the membrane framework can be modulated by appropriate selection of the monomers.

Figure 2D:
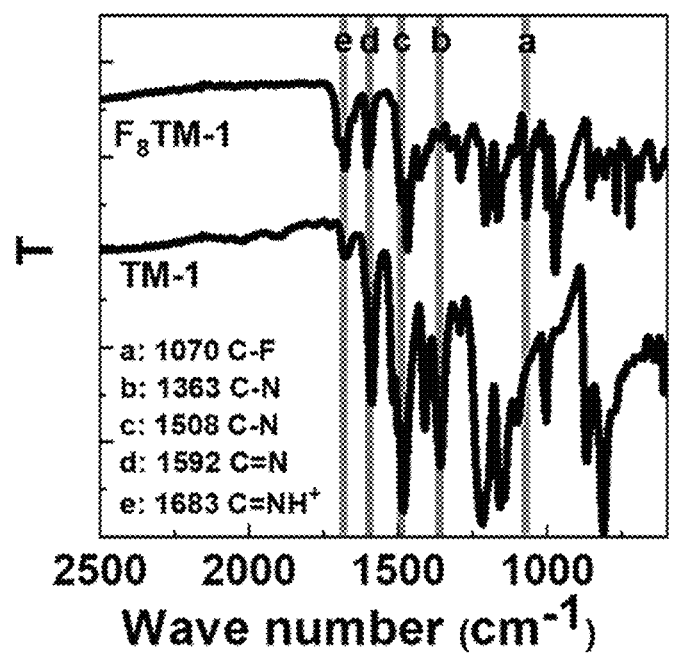
Figure 2E:
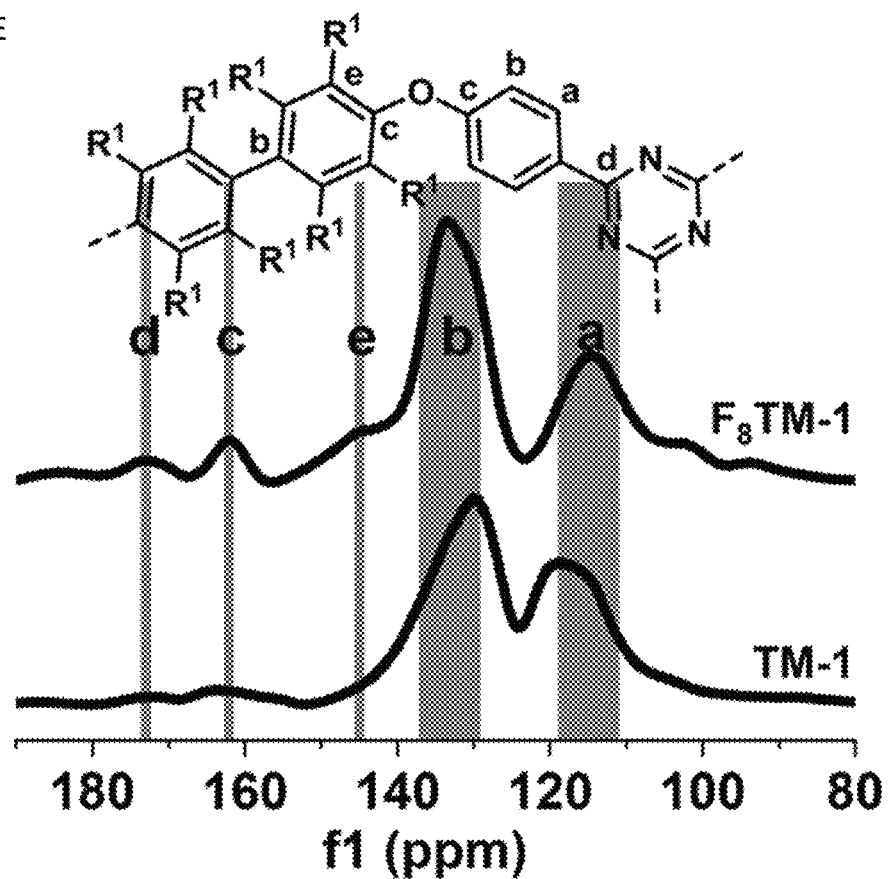
Figure 2F:
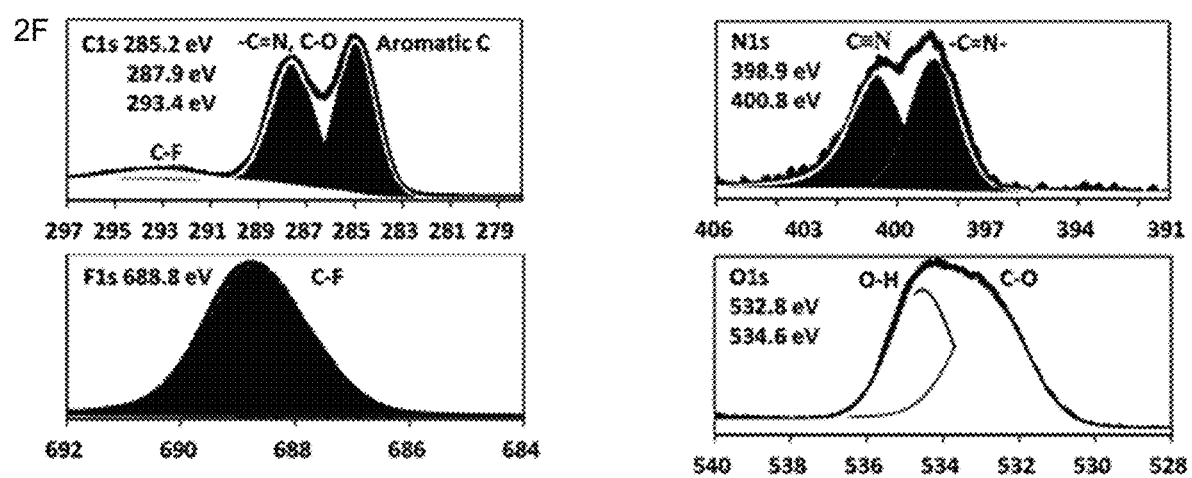

The successful polymerization through the formation of a triazine framework was further verified spectroscopically. In the Fourier-transform infrared (FT-IR) spectrum (FIG. 2D), the presence of triazine units was confirmed by two strong absorption bands at 1508 $cm^{-1}$ and 1363 $cm^{-1}$ corresponding to the aromatic C—N stretching and breathing modes in the triazine unit, respectively, together with the characteristic peak for C=N located at 1592 $cm^{-1}$. Additionally, protonated nitrile groups (C=$NH^+$) were also observed with characteristic peak at 1683 $cm^{-1}$ due to the presence of excess strong acid during the fabrication process. However, the characteristic signal for nitrile groups at 2230 $cm^{-1}$ was evidently not present. Compared with TM-1, an additional peak located at 1070 cm' for $F_8TM$-1 can be assigned to C—F bond stretching. As evidenced by the cross-polarization magic-angle spinning (CP/MAS) $^{13}C$ NMR spectrum (FIG. 2E), the presence of $sp^2$ carbons at 172.1 ppm confirmed the formation of triazine building block (d). The existence of the C—O bond is evidenced by the signal at 162.0 ppm (c). The signal of C—F bonds in $F_8TM$-1 are located at 144.3 ppm, which is absent in TM-1 (e). In addition, the chemical shifts for aromatic carbons in $F_8TM$-1 (133.1 ppm) are a little higher than in TM-1 (130.6 ppm) due to the electron-withdrawing nature of fluorine atoms (label b). Solid state $^{19}F$ NMR of $F_8TM$-1 spectrum also confirms the presence of C—F bonds within the membrane skeleton, with two peaks located at −139.5 and −158.0 ppm, respectively, which is in accordance with the peaks in $F_8CN$-1 monomer. The successful formation of the triazine frameworks in $F_8TM$-1 was further confirmed by X-ray photo electron spectroscopy (XPS) analysis (FIG. 2F). In the C1s spectrum, three peaks with BEs at 285.2, 287.9 and 293.4 eV can be deconvoluted, which are ascribed to carbons of aromatic C, the C—O and C—N bond in triazine ring, and C—F bond, respectively (Y. Zhao et al., *Energy Environ. Sci.*, 6, 3684-3692, 2013). The N1s spectrum also shows the presence of triazine functionalities with BE=398.9 eV, together with protonated terminal nitrile group (BE=400.8 eV) (X. Zhu et al., Ibid.). Both fluorine and ether groups were detected in the F1s spectrum for C—F bond (BE=688.8 eV) and O1s spectrum for C—O—C bond (BE=532.8 eV). Some of the ether groups are hydrolyzed to form O—H bond (BE=534.2 eV) under strongly acidic conditions, or perhaps nitrile groups are hydrolyzed to form carboxylic acid groups. Comparatively, the signals for cyano groups in C1s (BE=286.5 eV) and N1s (BE=399.3 eV) spectra of $F_8CN$-1 disappear. The structure of TM-1 was also confirmed by XPS analysis in comparison with CN-1, except that no C—F bond was observed. The powder X-ray diffraction (PXRD) pattern indicated an amorphous structure of the membranes.

Figure 3A:
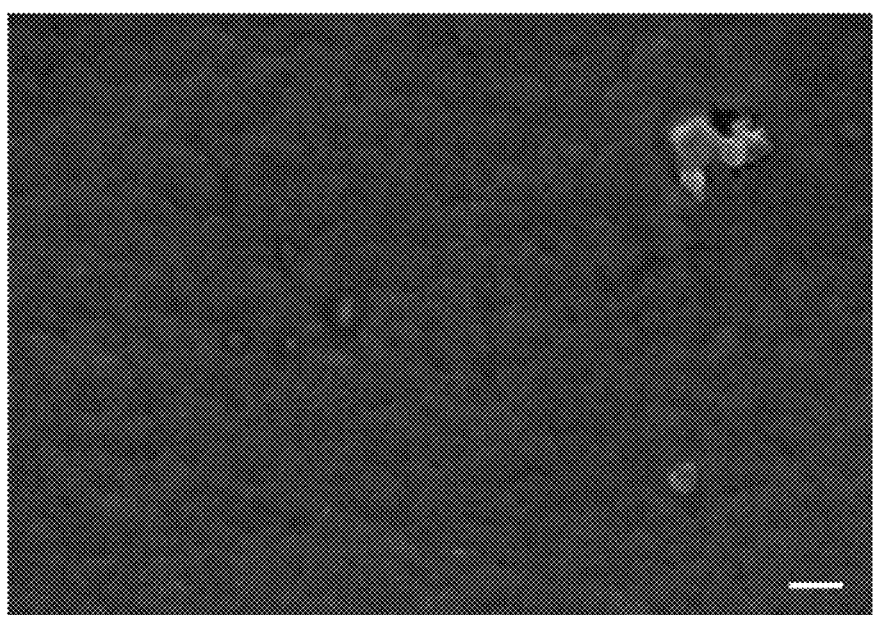
FIGS. 3A-3F show scanning electron microscopy (SEM) micrographs of the fluorinated membranes.
Figure 3B:
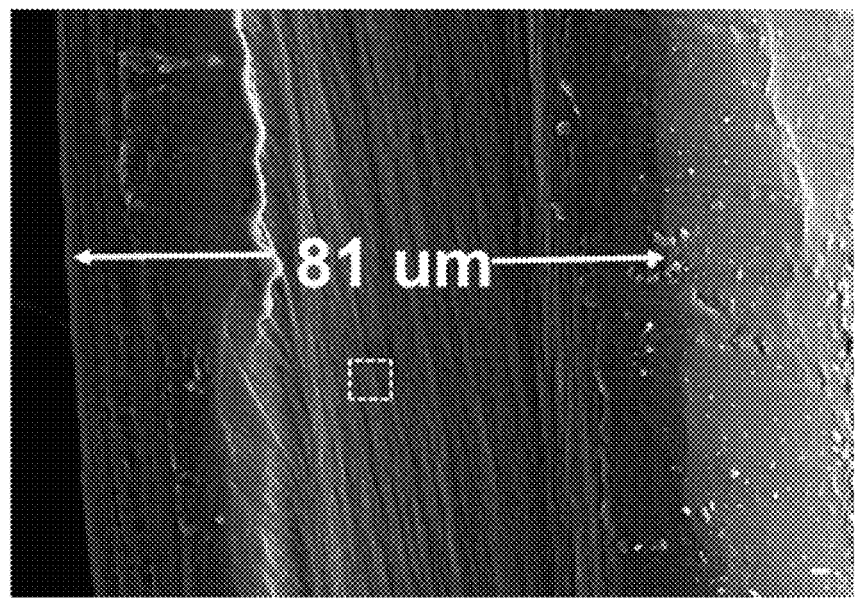
Figure 3C:
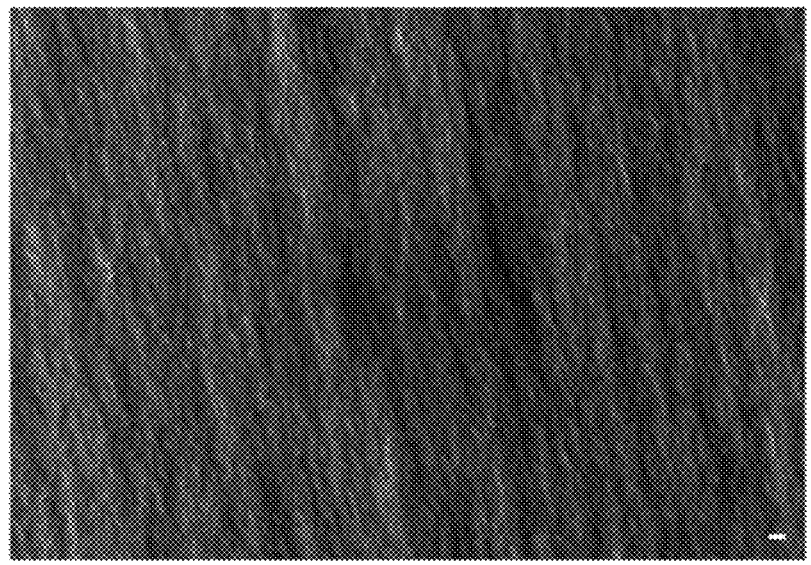

The morphology and nanostructure of $F_8TM$-1 was further characterized by scanning electron microscopy (SEM) (FIGS. 3A-3C). FIG. 3A shows a top view of F8TM-1. FIG. 3B shows a cross-section of F8TM-1. FIG. 3C is an enlarged view of the section outlined in FIG. 3B. The top view of $F_8TM$-1 membrane exhibits a smooth, nearly defect-free surface and a non-porous structure. The polymeric membrane produced has a thickness of 81 μm. The observation with the SEM at higher magnification shows a homogeneous stripy morphology of the cross-section for $F_8TM$-1. In order to obtain a detailed morphology information of the membranes, transmission electron microscopy (TEM) images of $F_8TM$-1 were collected after grinding the membranes into a powder, which showed that the membrane was composed of abundant layered structures, forming the strip-like morphology through compact stacking.

Gas Separation Properties of the Fluorinated Membranes

Gas permeability measurements were performed using a custom test chamber that has previously been described in detail (S. M. Mahurin et al., *J. Membr. Sci.* 368, 41-47). The samples were not large enough to occupy the entire area of the test chamber (47 mm²). Thus, they were masked by first placing a section of the material on a 47 mm² piece of adhesive-backed aluminum with a hole cut in the center. The membrane/adhesive aluminum assembly was then attached to a 47 mm² aluminum disk (1/16 in. thick) whose center was cut with a mating hole corresponding to the hole in the adhesive-backed aluminum, thus creating a sandwich. A thin layer of epoxy was placed on the interface between the membrane and the aluminum to seal the membrane completely and to ensure that the only available diffusion path would be through the membrane. The diameter of the membrane as defined by the holes cut in the center of the aluminum was measured to be 15 mm. The thickness of the membrane was measured using high resolution calipers. The membrane was then placed in the test chamber and evacuated to ~20 mTorr, where it remained overnight.

Single-gas permeability measurements were performed by isolating the two parts of the chamber (the permeate side and the retentate side) and introducing each gas to the retentate side until a pressure of 45 kPa was reached. The pressure rise on the permeate side was monitored using a 10 Torr Baratron gauge (MKS Instruments) and a data logging program. After an initial delay time corresponding to the time for diffusion through the membrane, the pressure in the permeate side rose linearly with time. From the slope of this pressure rise and the properties of the membrane, the permeability (P) was calculated using the following equation:

$$P = \frac{Vt}{RTA\Delta P}\frac{dp}{dt}$$

where V is the permeate volume, t is the membrane thickness, R is the ideal gas constant, T is the absolute temperature, A is the membrane area, Δp is the pressure difference across the membrane, and dp/dt is the rate of gas pressure increase on the permeate side. Permeability is traditionally reported in the unit of barrer [1 barrer=$10^{-10}$·cm³ (STP)·cm/(cm²·s·cmHg)].

Ideal selactivity is typically used to characterize the efficiency of a membrane to separate a faster-permeating species from a slower-permeating species, which can be defined as the ratio of single-gas permeabilities:

$$\alpha_{A/B} = \frac{P_A}{P_B}$$

Permeability can be deconvoluted into the product of a kinetic factor (diffusivity) and a thermodynamic factor (sorption coefficient):

$$P_A = D_A * S_A$$

in which D is diffusivity (cm²/s) and S is sorption coefficient (cm³ (STP)/cm³·cmHg).

The ideal selectivity can be written as the product of diffusion selectivity and sorption selectivity:

$$\alpha_{AB} = \alpha_D * \alpha_S = \left(\frac{D_A}{D_B}\right) * \left(\frac{S_A}{S_B}\right)$$

in which $\alpha_D$ is diffusion selectivity and as is sorption selectivity. Diffusivity can be estimated using the time lag method:

$$D = \frac{l^2}{6\theta}$$

in which l is thickness of the separation layer and θ is the permeation time lag.

Gas transport behaviors in the mixed gas permeation tests were measured using the constant pressure/variable volume technique. A mixture of $CO_2$ and $N_2$ (50 vol %:50 vol %, or 15 vol %:85 vol %) was used as a feed gas and Ar was chosen as sweep gas. The pressure at the feed side was 0.3 MPa, and the temperature was set as 25° C. When the membranes were tested in the humid state, the feed and sweep gases were both humidified by water bottles. After humidifying, the relative humidity was about 90%. When the system reached steady-state, all the gas permeation measurements were performed more than five times.

The selectivity can be obtained by this equation:

$$\alpha_{A/B} = \frac{y_A/y_B}{x_A/x_B}$$

where x and y are the volumetric fractions of the one component in the feed and permeate respectively, which were detected by the gas chromatography.

Figure 2G:
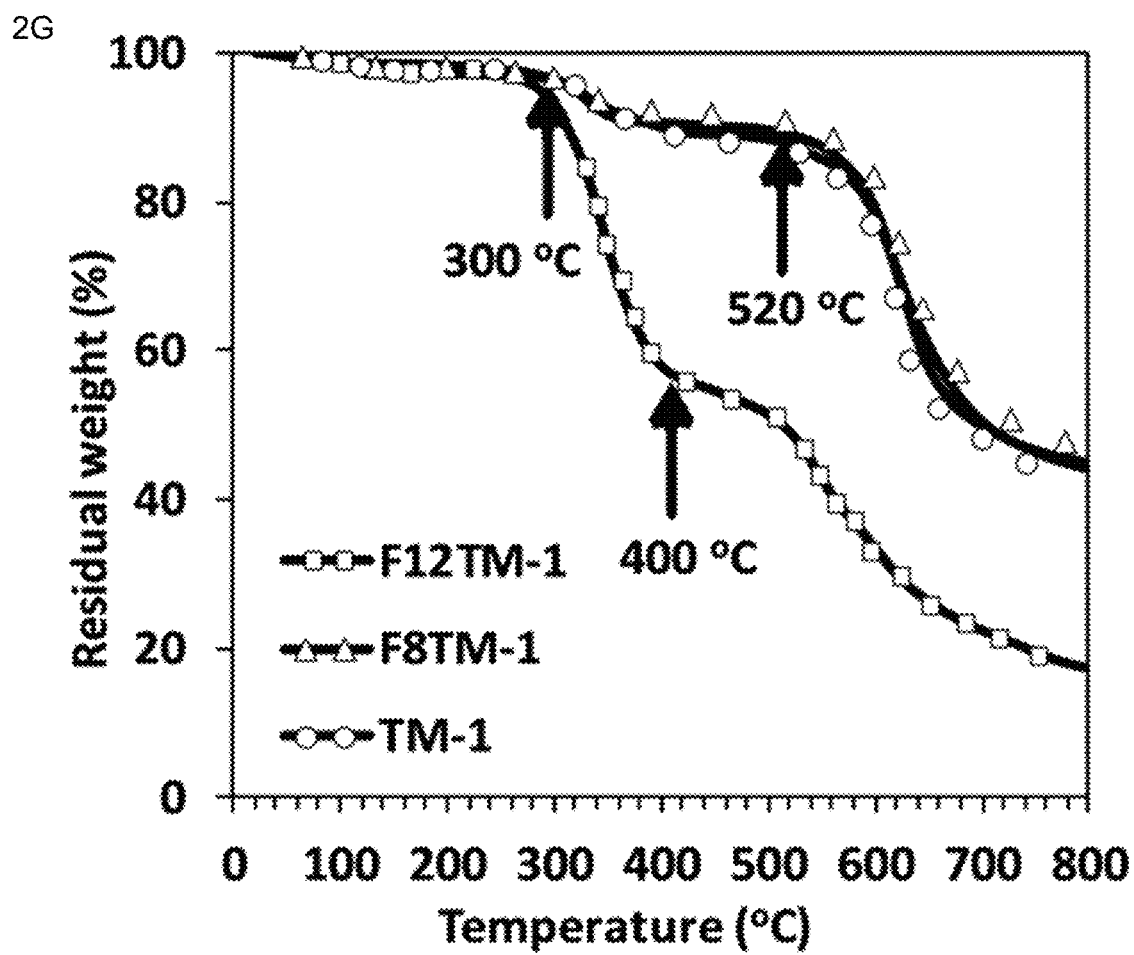
FIG. 2G shows TGA analysis results for $F_8TM$-1, TM-1, and $F_{12}TM$-1 obtained under $N_2$ with ramping rate of 10° C. $min^{-1}$.
Figure 4A:
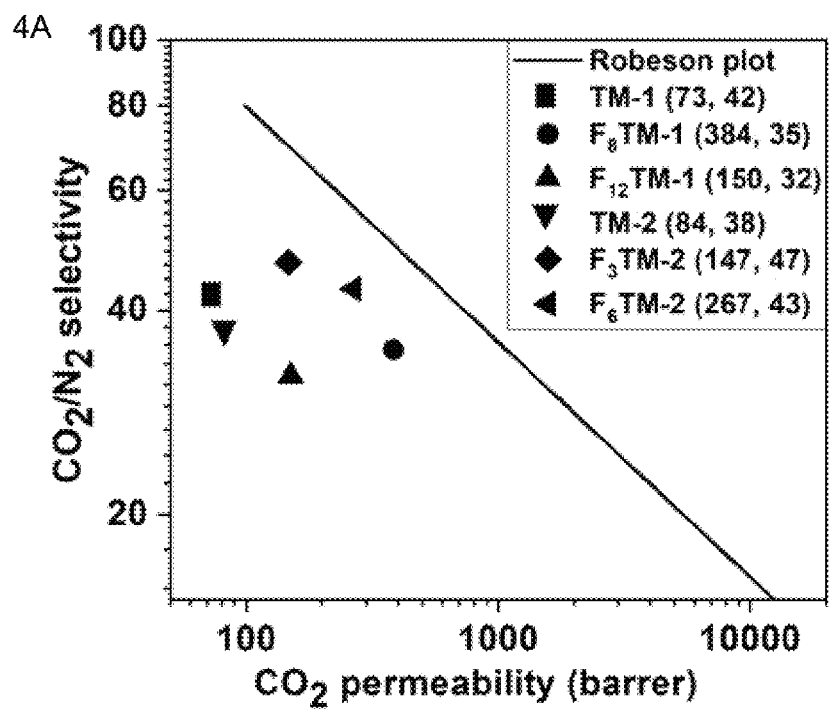
FIGS. 4A-4F show textural properties, $CO_2$ uptakes, and $CO_2$ separation performances of selected membranes.
Figure 4B:
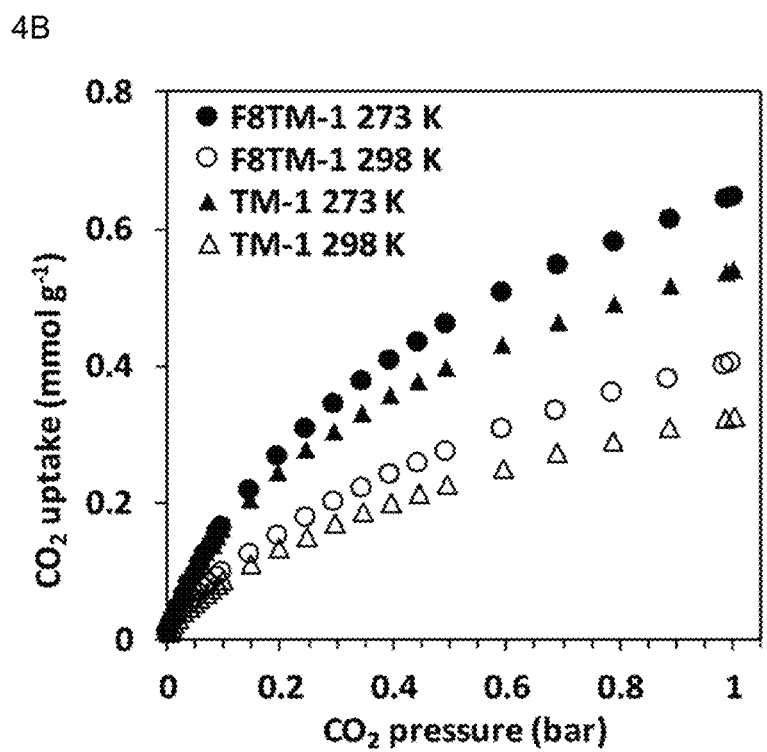

The $CO_2$ separation performance of the membranes was examined using a non-steady-state permeation cell at 298 K and a pressure difference of 45 KPa. A plot of an ideal $CO_2/N_2$ selectivity ($\alpha(CO_2/N_2)$) versus $CO_2$ permeability ($P_{CO2}$) is shown in FIG. 4A. Triazine-based membranes containing fluorine atoms exhibit better $CO_2$ separation performance, that is, with the values much closer to the upper bound of the Robeson plot compared to non-fluorinated analogs. Among these, $F_8TM$-1 shows the best performance with $P_{CO2}$ of 384 barrer and $\alpha(CO_2/N_2)$ of 35, demonstrating separation enhancement effect exerted by introduction fluorine atoms within the membrane framework. FIG. 4B shows $CO_2$ adsorption isotherms of $F_8TM$-1 and TM-1 measured at 273 K and 298 K. As shown in FIG. 4B, $F_8TM$-1 also exhibits enhanced $CO_2$ uptake [0.65 (273 K) and 0.40 mmol (298 K)] in comparison with TM-1 [0.54 (273 K) and 0.33 mmol $g^{-1}$ (298 K)] at $CO_2$ pressure of 1 bar. Surprisingly, $F_{12}TM$-1 exhibited inferior $CO_2$ separation performance with $P_{CO2}$ of 150 barrer and $\alpha(CO_2/N_2)$ of 32, probably due to lower reactivity of the monomer ($F_{12}CN$-1) and hence lower polymerization degree for the trimerization of cyano groups, as shown by the thermogravimetric analysis (TGA) results (FIG. 2G). Comparatively, TM-1 shows a much lower $P_{CO2}$ of 73 barrer but higher $\alpha(CO_2/N_2)$ selectivity of 42. Notably, the trimerization reactivity of CN-1 was higher than that of $F_8CN$-1 with electro-withdrawing C—F bonds. Thus, the content of C=N bond (57%) in TM-1 was higher than that in $F_8TM$-1 (45%) (FIG. 2F), and correspondingly, $F_8TM$-1 has a higher content of C=$NH^+$. However, compared with their difference in fluorine content, that is, 0 wt % in TM-1 and 17.8 wt % in $F_8TM$-1 obtained from the XPS analysis, the influence derived from the different ratio of nitrogen-containing species was relatively small, and it is difficult to determine the influence of the C—F bond. For membranes of TM-2 with different fluorine content, the enhanced $CO_2$ separation performance with increased fluorine content within the membrane backbone is shown by the variation of both $P_{CO2}$ and $\alpha(CO_2/N_2)$ in the following order: TM-2 (84, 38)<$F_3TM$-2 (147, 47)<$F_6TM$-2 (267, 43). $F_8TM$-1 also exhibits enhanced $CO_2$ uptake [0.65 (273 K) and 0.40 mmol $g^{-1}$ (298 K)] compared to TM-1 [0.54 (273 K) and 0.33 mmol $g^{-1}$ (298 K)] at $CO_2$ pressure of 1 bar (FIG. 4B). A low polymerization degree of $F_{12}TM$-1 also contributed to its inferior $CO_2$ uptake capacity (only 0.36 mmol $g^{-1}$ (273 K) and 0.21 mmol $g^{-1}$ (298 K)).

Fabrication, Characterization and $CO_2$ Uptake Properties of N, O, F-Doped Nanoporous Carbon Molecular Sieve Membranes As noted above, introducing C—F bonds into the membrane backbone led to a significant increase in the $CO_2$ separation performance and uptake capacity. However, the $CO_2$ permeability is still somewhat less than ideal for practical applications due to the low Brunauer-Emmett-Teller (BET) surface area (<1 $m^2g^{-1}$) of the obtained membranes derived from the nitrile monomers containing relatively flexible ether groups. In order to obtain fluorinated triazine-based nanoporous carbon molecular sieve membranes, TGA of $F_8TM$-1, $F_{12}TM$-1 and TM-1 was first conducted under $N_2$ up to 800° C. to measure the thermal stability of the membranes (FIG. 2G). FIG. 2G shows TGA analysis results obtained under $N_2$ with ramping rate of 10° C. $min^{-1}$. The results indicate that $F_{12}TM$-1 has poor thermal stability, and the membrane starts to decompose rapidly at 300° C., which makes it an inferior candidate for the fabrication of carbonaceous membrane. Comparably, $F_8TM$-1 and TM-1 have similar stabilities, with two decomposition stages beginning at 300° C. (loss of trapped solvent and monomers) and 520° C. (decomposition and rearrangement of the polymer skeleton), respectively. Residual weight of ~45 wt % is still retained at 800° C., demonstrating the possibility to fabricate F, O, N-doped porous carbonaceous membranes by carefully adjusting the pyrolysis temperature.

Figure 3D:
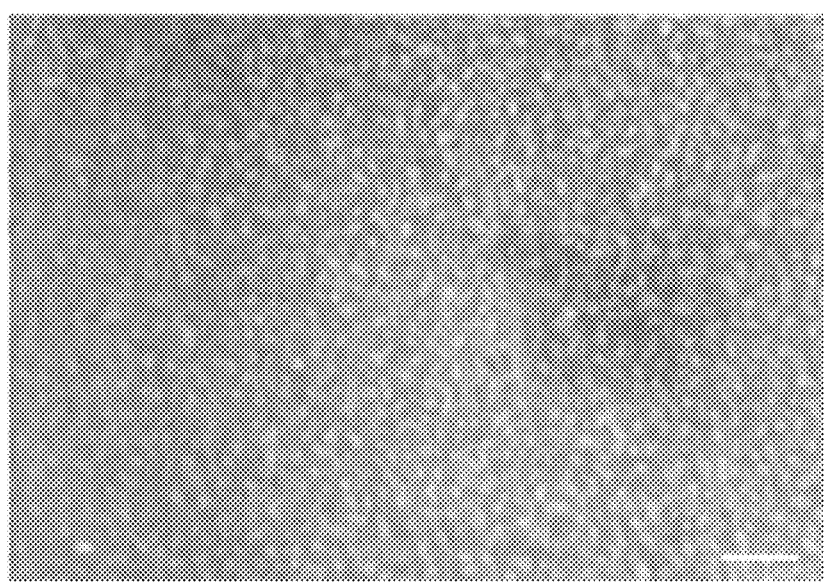
Figure 3E:
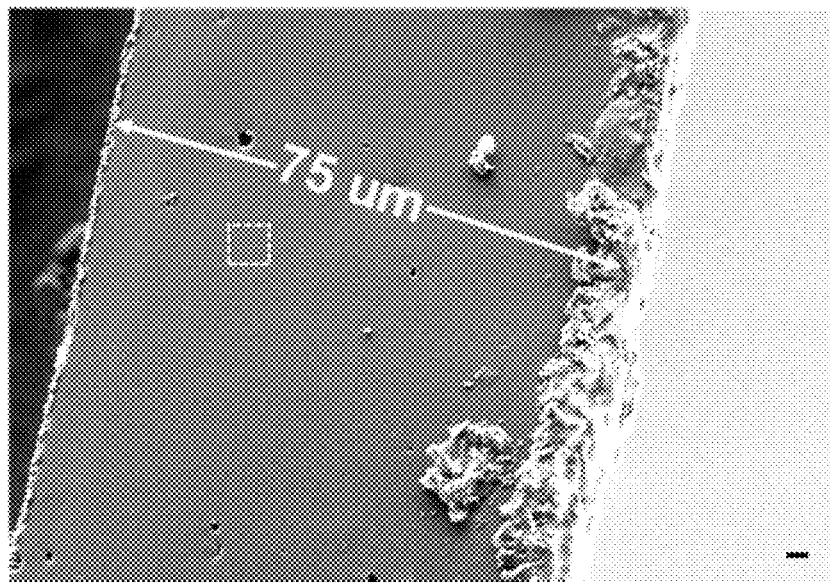
Figure 3F:
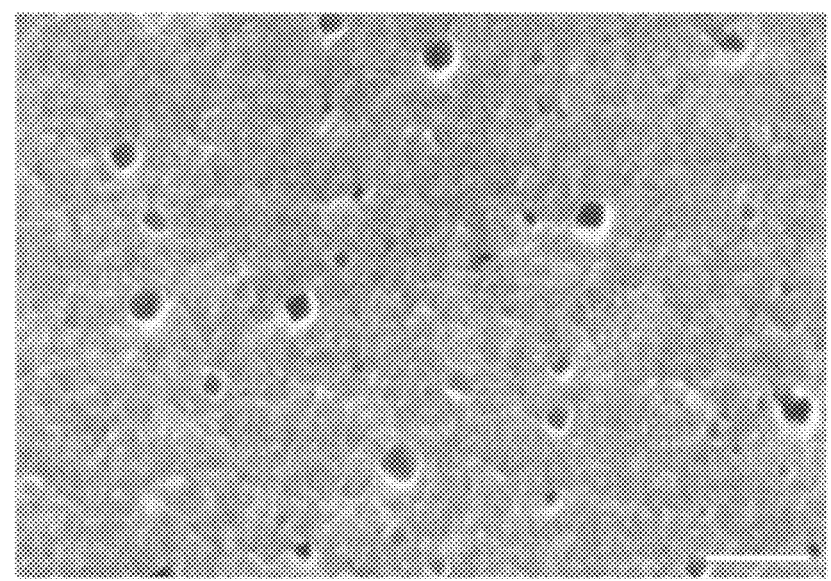
Figure 4C:
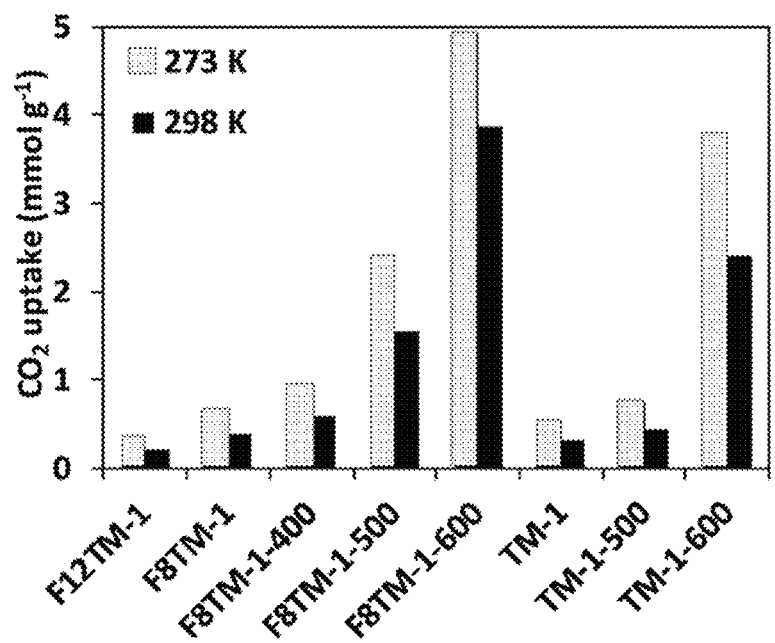

$F_8TM$-1 was first studied to investigate the influence of pyrolysis temperature on the resultant membranes, denoted as $F_8TM$-1-T (T=pyrolysis temperature). After treating $F_8TM$-1 at 400° C. under $N_2$ to remove the locked solvents and unreacted monomers, the obtained $F_8TM$-1-400 still had a low surface area (<1 $m^2g^{-1}$); however, its $CO_2$ uptake capacity slightly increased to 0.94 (273 K) and 0.6 mmol $g^{-1}$ (298 K) at $CO_2$ pressure of 1 bar (FIG. 4C). Further increasing the pyrolysis temperature to 500° C. led to the formation of $F_8TM$-1-500. The top view SEM image of $F_8TM$-1-500 clearly reveals that the outer continuous network of the surface is composed of small polymer nanoparticles (FIG. 3D). The thickness of $F_8TM$-1-500 slightly decreased to 75 μm (FIG. 2E). Closer examination of the cross-section of the membrane reveals that randomly distributed blind holes or defects with diameters of 10~50 nm are present throughout the interior of the membrane (FIG. 3F). TEM images of $F_8$-TM-1-500 after grinding also reveals that the layered structure is well preserved without the obvious presence of the mesopores.

Figure 4D:
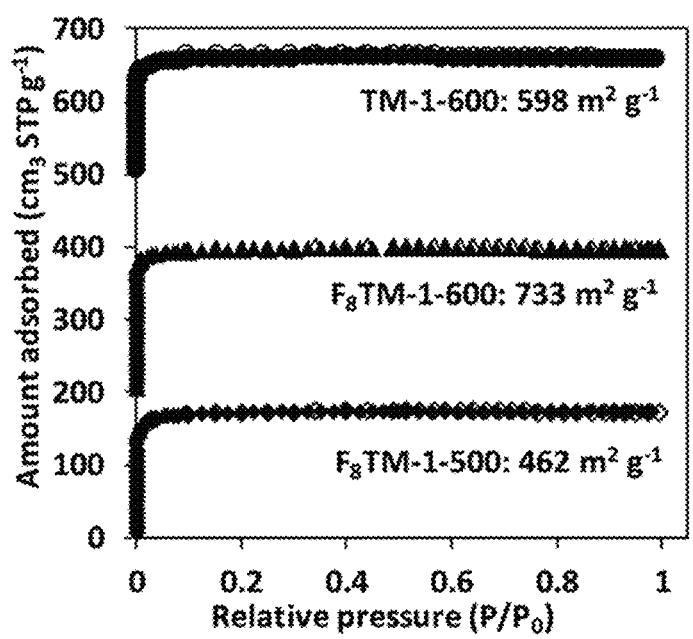

Textural information on $F_8TM$-1-500 was obtained via $N_2$ sorption analysis at 77 K, which shows a first step at $P/P_0$<0.05 and exhibits a typical type I isotherm, which indicates a solely microporous structure (FIG. 4D). Its BET surface area is calculated to be 462 $m^2 g^{-1}$, with total pore volume of 0.21 $cm^3 g^{-1}$. As previously reported, the presence of ultra-micropores with the dimensions close to the kinetic diameters of $CO_2$ (0.330 nm) within the materials could significantly enhance the $CO_2$ uptake and separation performance, as well as selectivity towards other gases (e.g., H. Wnag et al., Chem. Soc. Rev. 48, 488-516). Notably, abundant ultra-micropores with the pore size distribution of 0.5~1.0 nm (FIG. 4E), obtained from the adsorption branches using non-local density functional theory (NLDFT) method, renders the obtained carbonaceous N, O, F-functionalized membrane a good candidate for $CO_2$ separation. Accordingly, the $CO_2$ uptake capacity of $F_8TM$-1-500 shows an obvious increase to 2.40 (273 K) and 1.56 mmol $g^{-1}$ (298 K) at $CO_2$ pressure of 1 bar (FIG. 4C). In order to study the potential use of the membranes in gas separation, single component adsorption isotherms for $N_2$ were also collected. $CO_2/N_2$ selectivities were obtained using initial slope ratios estimated from Henry's law constants. The $CO_2/N_2$ selectivities of $F_8TM$-1-500 were calculated to be 48.7±1.2 (273 K) and 41.0±1.1 (298 K), which are higher than the most reported previously for the carbonaceous membranes.

Figure 4E:
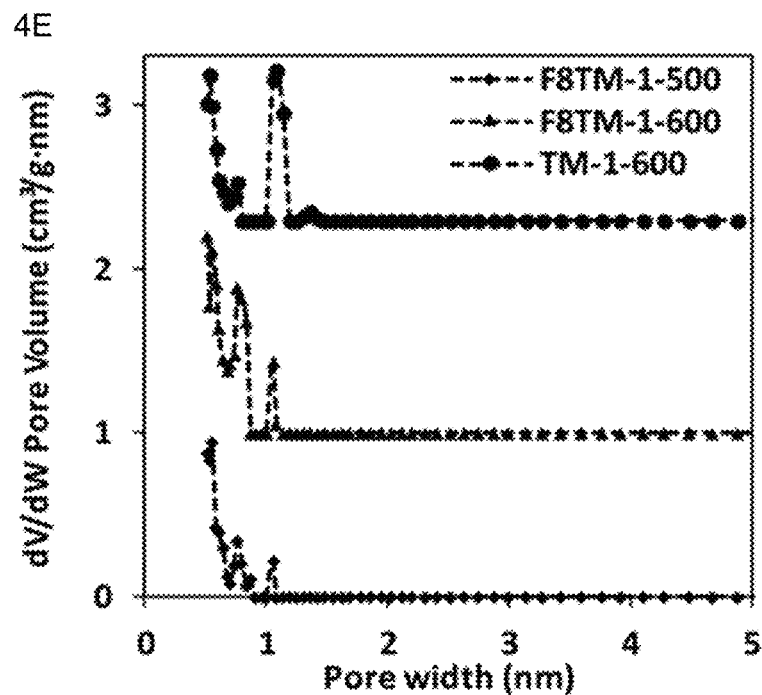

$F_8TM$-1-600 shows higher BET surface area (733 $m^2 g^{-1}$) and total pore volume (0.31 $cm^3 g^{-1}$) compared with $F_8TM$-1-500 due to decomposition of polymer fragments with low polymerization degree. However, homogeneous distribution of ultra-micropores was still maintained with pore size distribution of $F_8TM$-1-600 in the range of 0.5-1 nm, and without the presence of the mesopores, as shown by the type I $N_2$ adsorption isotherm (FIG. 4D) and pore size distribution curve (FIG. 4E). Accordingly, $CO_2$ uptake capacity (1 bar) up to 4.92 (273 K) and 3.88 mmol $g^{-1}$ (298 K) was achieved (FIG. 4C), which are higher than most values previously reported for membranes based on microporous organic materials (X. Zhou et al., *Adv. Mater.* 30, 1700750). Relatively high $CO_2/N_2$ selectivity for $F_8$TM-1-600 was maintained as 29.9±1.1 (273 K) and 26.4±0.5 (298 K).

Pyrolysis of TM-1 was conducted for comparison. Notably, TM-1-500 shows a BET surface area of only 0.7 $m^2$ $g^{-1}$, which indicates that the pore formation effect by cleavage of C—F bond in $F_8$TM-1 is much more efficient than that of C—H bond in TM-1, as the Van der Waals radius of fluorine (147 pm) is much larger than that of hydrogen (53 pm). Accordingly, although $CO_2$ uptake capacity (1 bar) of TM-1-500 is slightly increased to 0.75 (273 K) and 0.45 mmol $g^{-1}$ (298 K), this value is still much lower than that of $F_8$TM-1-500 (FIG. 4C). Increasing the pyrolysis temperature to 600° C. led to the formation of TM-1-600 having a surface area of 598 $m^2$ $g^{-1}$ together with a total pore volume of 0.24 $cm^3$ $g^{-1}$ and pore size distribution of 0.5~1.4 nm (FIG. 4E). The abundant micropores within TM-1-600 also supply the favorable factor for $CO_2$ adsorption, with a capacity of 3.78 (273 K) and 2.40 mmol $g^{-1}$ (298 K) at $CO_2$ pressure of 1 bar being achieved, together with $CO_2/N_2$ selectivities of 28.4±0.4 (273 K) and 23.7±0.4 (298 K) (FIG. 4C). For both $F_8$TM-1 and TM-1, the membranes were decomposed and could not be retained at a pyrolysis temperature of 700° C.

The detailed chemical structures of membranes obtained after pyrolysis, including $F_8$TM-1-500, $F_8$TM-1-600 and TM-1-600, were characterized by FT-IR, solid state $^{13}$C and $^{19}$F NMR, and XPS techniques. FTIR spectra reveal that (1) the peak for C=$NH^+$ (1683 $cm^{-1}$) disappeared after thermal treatment and simultaneously signal for nitrile groups (2230 $cm^{-1}$), although very weak, is observed, indicating the existence of unreacted nitrile groups after removing the residual acid by heating; (2) the triazine units with characteristic peaks at 1363, 1508 and 1592 cm' are well preserved in $F_8$TM-1-500, which become somewhat weak in $F_8$TM-1-600, which indicates rearrangement of the polymer skeleton and partial cleavage of the triazine units at high temperature; (3) C—F bond is clearly observed in $F_8$TM-1-500 but almost disappears in $F_8$TM-1-600. A reduced intensity of the signal for triazine units was also observed in the FTIR spectrum of TM-1-600. All of these results confirm the partial cleavage of the C—N, C=N and C—F bonds during thermal treatment, particularly at 600° C.

The solid-state $^{13}$C NMR of $F_8$TM-1-500 spectrum shows the presence of carbons in benzene ring (label a and b), C—O bond (label c), triazine unit (label d), and C—F bond (label e), but with decreased intensity compared with those in $F_8$TM-1 (FIG. 2E). However, in the solid state $^{13}$C NMR spectra of $F_8$TM-1-600 and TM-1-600, only a broad peak is present, which indicates the aromatic carbon region. Lack of signals for C—O, C—F and triazine is likely caused by decreased content of these functionalities after heating at 600° C., considering the low sensitivity of solid state $^{13}$C characterization. In the solid state $^{19}$F NMR spectrum of $F_8$TM-1-500, signals corresponding to the C—F bonds can be clearly distinguished. However, the intensity is significantly decreased for $F_8$TM-1-600, and only one broad peak is reserved, indicating that the C—F bond of type a is more easily cleaved.

XPS analysis of the carbon molecular sieve membranes was further conducted to get an additional insight of the chemical structure features. From the XPS analysis, the surface fluorine content in $F_8$TM-1 is 17.8 wt %, which is slightly decreased to 12.6 wt % in $F_8$TM-1-500 and then sharply decreased to 4.7 wt % in $F_8$TM-1-600, which is in agreement with the changes observed in both the FTIR and solid-state NMR spectra. Compared with $F_8$TM-1 (FIG. 2F), after thermal treatment at 500° C. ($F_8$TM-1-500), the carbon ratio in C—O and triazine functionalities decreases from 44% to 29% due to cleavage of these bonds and loss of the corresponding segments. In addition, rearrangement of the membrane skeletons leads to the formation of N—O bonds and disappearance of the C=$NH^+$ functionalities, as shown in the N1s and O1s spectra. For $F_8$TM-1-600 obtained at higher temperature, the nitrogen ratio in C=N decreases from 55% to 19% while that in N—O bonds increases from 45% to 81% on the surface. The same phenomenon is observed in the XPS spectra of TM-1-600, compared with that of TM-1. The difference in textural structures as well as the content of fluorine atoms between $F_8$TM-1-500, $F_8$-TM-1-600 and TM-1-600 leads to significant changes in their $CO_2$ separation performance, as shown below.

Figure 4F:
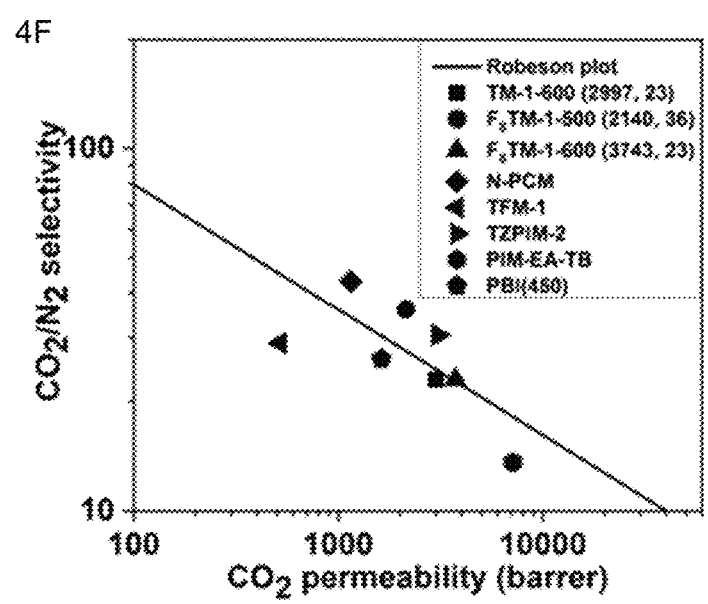

Gas Separation Properties of the N, O, F-Doped Nanoporous Carbon Molecular Sieve Membranes The detailed separation performances of $CO_2$ over $N_2$ were measured, as shown in FIG. 4F. Compared with $F_8$TM-1, using $F_8$TM-1-500, much higher $P_{CO2}$ is obtained with 2140 barrer together with $\alpha(CO_2/N_2)$ of 36, which exceeds the upper bound limit suggested by Robeson in 2008 (L. M. Robeson et al., *J. Membr. Sci.* 320, 390-400, 2008). As for $F_8$TM-1-600, the $P_{CO2}$ and $\alpha(CO_2/N_2)$ are measured to be 3743 Barrer and 23, respectively, which is superposed with the most recent upper bound, and are comparable or better than most of the carbonaceous membranes described in the literature (FIG. 2F). Notably, the $CO_2$ separation effect of $F_8$TM-1-500 is comparable with the performance obtained by MOF scaffold coated with poly (ethylene glycol) ($\alpha(CO_2/N_2)$=35, $PCO_2$=2700 barrer) (K. Xie et al., *Angew. Chem. Int. Ed.* 57, 8597-8602, 2018). The $CO_2/N_2$ separation performance of TM-1-600 was also tested, which shows a slightly lower $P_{CO2}$ of 2997 together with the same $\alpha(CO_2/N_2)$ of 23. Generally, the highest $\alpha(CO_2/N_2)$ was achieved with $F_8$TM-1-500, which indicates the enhancement by introducing fluorine species. Higher $P_{CO2}$ was obtained with TM-1-600 mainly due to its higher surface area (598 $m^2$ $g^{-1}$) compared with that of $F_8$TM-1-500 (462 $m^2$ $g^{-1}$). A similar phenomenon has been observed for $F_8$TM-1-600 with even higher surface area of 733 $m^2$ $g^{-1}$ while maintaining the same $\alpha(CO_2/N_2)$.

Using the same procedure but changing the amount of the monomer $F_8$CN-1 and $CF_3SO_3H$, $F_8$TM-1, membranes with various thicknesses were prepared, and after pyrolysis, $F_8$TM-1-500 with thicknesses of 30, 75 and 146 μm were fabricated. The $CO_2$ separation performance results show that, compared with the membrane with thickness of 75 μm, which had $\alpha(CO_2/N_2)$ of 36 versus $P_{CO2}$ of 2140 barrer, decreasing the membrane thickness to 30 μm led to a comparable $\alpha(CO_2/N_2)$ of 34 and $P_{CO2}$ of 2143 barrer. In comparison, $F_8$TM-1-500 with a thickness of 146 μm exhibited a decreased $\alpha(CO_2/N_2)$ of 27 versus increased $P_{CO2}$ of 4015 barrer. For $F_8$TM-1-500 with thickness of 146 μm, the time lag (θ) for $CO_2$ and $N_2$ is 0.77 and 1.28 min, respectively, which is short compared with the carbon/carbon mixed-matrix membranes derived from the pyrolysis of the polyimide precursor (C. Zhang et al., *Adv. Mater.* 29, 1701631, 2017) due to the high surface area (462 $m^2$ $g^{-1}$) and abundant micropores within the structure. Accordingly, the diffusion selectivity and sorption selectivity were calculated to be 1.7 and 15.9, respectively. Therefore, the solubility contribution to permeability was much greater than the diffusivity contribution. That is, with the higher $CO_2$ uptake, the solubility of this gas overwhelms the dynamics of adsorption in the diffusion process, which is the key to achieve such high $CO_2/N_2$ selectively in the membrane.

These results indicate that the F, O, N-containing $CO_2$-philic nanodomains in the membrane skeleton play an important role in propagating $CO_2$ molecules through the membrane.

Subsequently, a binary $CO_2/N_2$ test was conducted using $F_8TM$-1-500 at 25° C. Generally, the $\alpha(CO_2/N_2)$ in mixed gas test is lower than that in pure gas test mainly ascribed to the competitive sorption in membranes. With the $CO_2/N_2$ 15/85 mol % in feed, $\alpha(CO_2/N_2)$ of 27 was achieved together with slightly increased $P_{CO2}$ of 3712 barrer. In comparison, with the $CO_2/N_2$ 50/50 mol % in feed, higher $P_{CO2}$ permeability of 4660 barrer together with lower $\alpha(CO_2/N_2)$ of 20 was achieved. Notably, in the field, the presence of water in the atmosphere is inevitable, and usually the $H_2O$ molecule competes with $CO_2$ for the active sites that provide selectivity. This is well illustrated in the case of MOF s-derived materials, which exhibit good performance in $CO_2$ separation under dry conditions, which diminishes considerably in the presence of water vapor. In the present study, the $CO_2$ separation performance of $F_8TM$-1-500 was also conducted under high relative humidity (~90%) conditions with $CO_2/N_2$ 50/50 mol % in feed. The results indicate that a relatively high $P_{CO2}$ of 4135 barrer can be retained and the $\alpha(CO_2/N_2)$ is only slightly decreased to 19. Therefore, the highly hydrophobic nature of $F_8TM$-1-500 provided by both carbon and fluorine functionalities renders this material a promising candidate for practical applications.

Overall, $F_8TM$-1-500 displays good performance for selective separation of $CO_2$ from $N_2$ and the plot of $\alpha(CO_2/N_2)$ vs. $P_{CO2}$ even surpassed the Robeson Upper Bound. While $F_8TM$-1-600 exhibits much higher $P_{CO2}$, and decreased $\alpha(CO_2/N_2)$, it is still superposed with the most recent upper bound. Considering that the pore size distribution of the carbon molecular sieve membranes in this work is in the range of 0.5~1 nm, which is larger than the kinetic diameters of both $CO_2$ (3.30 Å) and $N_2$ (3.64 Å), the adsorption/diffusion mechanism is likely mainly responsible for the high membrane separation performance. The adsorption/diffusion is critically dependent on the properties of the pore surface structure from heteroatoms including F, O and N. Heats of adsorption $(Q_{st})$ for $CO_2$ and $N_2$ using $F_8TM$-1-500 were calculated and the results show that the $Q_{st}$ for $CO_2$ achieved 32.0 kJ $mol^{-1}$ and in comparison, the highest $Q_{st}$ for $N_2$ was only 12.06 kJ $mol^{-1}$, which indicates the strong interaction of $CO_2$ with the membrane frameworks. Besides good $CO_2$ permeability and high $CO_2/N_2$ selectivity, high thermal stability of the membrane, particularly under air, is also critical for its utilization in flue gas separation, considering the practical high temperature atmosphere and the presence of $O_2$ (3~4%) as the most ubiquitous impurity in flue gas (K. Min et al., Nat. Commun. 9, 726, 2018). TGA under air was conducted to evaluate the thermal stability of the N, O, F-doped porous carbonaceous membranes in this work. The result showed that all the three kinds of membranes with efficient $CO_2$ separation performance exhibited high thermal stability under air up to 585° C. for $F_8TM$-1-500, which indicates its potential for use in practical separation of $CO_2$ in flue gas.

SUMMARY

In summary, the fluorinated carbon molecular sieve membranes developed in this work were fabricated from easily synthesized nitrile monomers through a simple sol-gel process, followed by a pyrolysis. The obtained membranes exhibit good $CO_2$ separation performance both under dry and humid conditions and high thermal stability under air atmosphere, which make them promising candidates for future scale-up industrial applications.

Fluorinated membranes based on CTFs have been obtained through a rational design of the aromatic nitrile monomers. The reactivity of the monomers in the trimerization reaction has herein been enhanced by simultaneously introducing ether groups to the para position and fluorine atoms to the meta position of the benzene rings relative to the cyano groups. A series of transparent and flexible polymeric membranes were obtained under mild reaction conditions. The $CO_2$ separation performance was significantly enhanced with the increase of fluorine content in the membrane. Furthermore, the presence of functionalized triazine units, fluorine atoms, and ether groups, as well as high thermal stability of the membranes made it possible to fabricate N, O, F-doped nanoporous carbon molecular sieve membranes for $CO_2$ separation. Specifically, membranes obtained after pyrolysis show high BET surface areas, high thermal stability under air and ultra-microporosity, as well as higher $CO_2$ adsorption capacity than most of the POPs reported in the literature. All of these properties make them excellent candidates for membrane-based $CO_2$ separation. High $CO_2$ permeability together with good $CO_2/N_2$ selectivity has been observed, exceeding the upper Robeson bound limit.

With functionalized triazine units, fluorine atoms, and ether groups, N, O, F-doped nanoporous carbon molecular sieve membranes obtained after pyrolysis exhibit intrinsic ultra-micropores (0.5~1.0 nm) and surface areas up to 733 $m^2$ $g^{-1}$. Excellent $CO_2$ adsorption capacity of 4.92 (273 K) and 3.88 (298 K) mmol $g^{-1}$ together with high single gas $CO_2/N_2$ selectivity of 48.7±1.2 (273 K) and 41.0±1.1 (298 K) indicate a substantial ability for $CO_2$ separation. Good ideal $CO_2$ permeability and $CO_2/N_2$ selectivity of 2140 barrer, 36 ($F_8TM$-1-500) and 3743 barrer, 23 ($F_8TM$-1-600), exceeding the Robeson upper bound, were achieved by tuning the pyrolysis temperature. In addition, the N, O, F-doped porous carbonaceous membranes exhibited excellent thermal stability under air up to 585° C. Through this general design and protocol, fluorinated membranes can be derived, significantly expanding the currently limited library of $CO_2$-philic membranes for highly efficient $CO_2$ separation.

Incorporation of fluorine functional groups into the skeleton of CTF-derived materials has herein been shown to significantly enhance the $CO_2$ sorption properties and catalytic activities. The perfluorinated FCTF-1-600 exhibited much higher $CO_2$ uptake capacity (5.53 mmol $g^{-1}$) than the non-fluorinated analogue (3.82 mmol $g^{-1}$) at 273 K, 1 bar and an exceptional $CO_2/N_2$ selectivity of 77 under kinetic flow conditions. $CO_2$ adsorption capacity was further increased to 5.98 mmol $g^{-1}$ by fluorinated F-DCBP-CTF-1 and 6.58 mmol $g^{-1}$ by $F_{12}CTF$-3 at 273 K and 1 bar.

While there have been shown and described what are at present considered the preferred embodiments of the invention, those skilled in the art may make various changes and modifications which remain within the scope of the invention defined by the appended claims.

What is claimed is:

1. A polymer composition comprising a covalent triazine framework having the following structure:

A units:

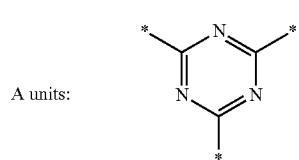

-continued

B units: *—R—(*)ᵣ wherein:
each asterisk (*) in A units denotes a point of covalent bonding with an asterisk in B units, and each asterisk (*) in B units denotes a point of covalent bonding with an asterisk in A units;
r is an integer of 1-3;
R is a fluorinated hydrocarbon containing at least two aromatic rings and at least one ether linkage between aromatic rings;
the composition includes a multiplicity of A units and multiplicity of B units; and
a portion of connection points are terminated by endcapping nitrile groups.

2. The polymer composition of claim 1, wherein at least a portion of the aromatic rings in R are substituted with at least one fluorine atom per aromatic ring.

3. The polymer composition of claim 1, wherein R contains at least one fluorinated alkyl or alkenyl group.

4. The polymer composition of claim 1, wherein R has the following structure:

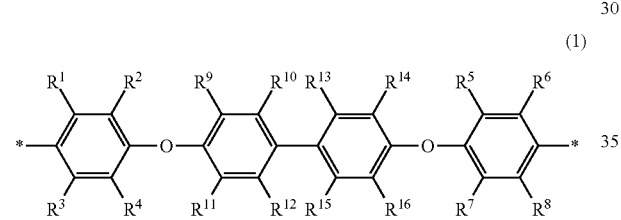

(1)

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are independently selected from hydrogen atom, fluorine atom, hydrocarbon groups (R') containing 1-12 carbon atoms, —OR" groups, —SR" groups, and —NR"2 groups, wherein R" is independently selected from hydrogen atom and R' groups;
wherein the R' hydrocarbon group is optionally substituted with one or more fluorine atoms to result in a fluorinated hydrocarbon group; and
wherein any two adjacent groups selected from $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ groups are optionally interconnected.

5. The polymer composition of claim 4, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are hydrogen atoms and one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are fluorine atoms.

6. The polymer composition of claim 4, wherein one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are hydrogen atoms and one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are fluorinated alkyl groups.

7. The polymer composition of claim 6, wherein none of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, and $R^{16}$ are fluorine atoms.

8. The polymer composition of claim 1, wherein R has the following structure:

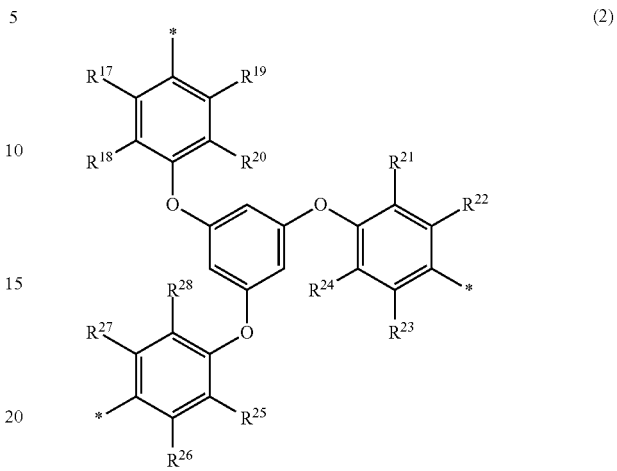

(2)

wherein $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are independently selected from hydrogen atom, fluorine atom, hydrocarbon groups (R') containing 1-12 carbon atoms, —OR" groups, —SR" groups, and —NR"2 groups, wherein R" is independently selected from hydrogen atom and R' groups;
wherein the R' hydrocarbon group is optionally substituted with one or more fluorine atoms to result in a fluorinated hydrocarbon group; and
wherein any two adjacent groups selected from $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ groups are optionally interconnected.

9. The polymer composition of claim 8, wherein one or more of $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are hydrogen atoms and one or more of $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are fluorine atoms.

10. The polymer composition of claim 8, wherein one or more of $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are hydrogen atoms and one or more of $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ are fluorinated alkyl groups.

11. The polymer composition of claim 10, wherein none of $R^{17}$, $R^{18}$, $R^{19}$, $R^{20}$, $R^{21}$ $R^{22}$, $R^{23}$, $R^{24}$, $R^{25}$, $R^{26}$, $R^{27}$, and $R^{28}$ are fluorine atoms.

12. The polymer composition of claim 1, wherein the composition possesses micropores having a size of 0.1 nm to 2 nm.

13. The polymer composition of claim 1, wherein the composition possesses ultramicropores having a size of 0.1 nm to 1 nm.

14. The polymer composition of claim 1, wherein the composition is microporous and in the shape of a membrane having a thickness of up to 200 microns.

15. A method for at least partially separating carbon dioxide gas from a carbon dioxide-containing mixture of gases, the method comprising passing the carbon dioxide-containing mixture of gases through a microporous polymer membrane, wherein gas exiting the microporous polymer membrane has an increased carbon dioxide concentration relative to the initial carbon dioxide-containing mixture of gases not passed through the microporous polymer membrane;

wherein said microporous polymer membrane possesses micropores having a size of 0.1 nm to 2 nm and has a covalent triazine framework composition having the following structure:

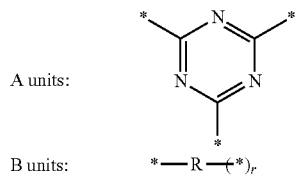

wherein:

each asterisk (*) in A units denotes a point of covalent bonding with an asterisk in B units, and each asterisk (*) in B units denotes a point of covalent bonding with an asterisk in A units;

r is an integer of 1-3;

R is a fluorinated hydrocarbon containing at least two aromatic rings and at least one ether linkage between aromatic rings;

the composition includes a multiplicity of A units and multiplicity of B units; and a portion of connection points are terminated by endcapping nitrile groups.

16. The method of claim 15, wherein the microporous polymer membrane possesses ultramicropores having a size of 0.1 nm to 1 nm.

17. The method of claim 15, wherein the microporous polymer membrane has a thickness of up to 200 microns.

18. The method of claim 15, wherein the carbon dioxide-containing mixture of gases is flue gas containing at least 5% carbon dioxide.

* * * * *